US011381389B2

(12) United States Patent
Wright

(10) Patent No.: US 11,381,389 B2
(45) Date of Patent: Jul. 5, 2022

(54) COMPUTER-IMPLEMENTED METHOD OF GENERATING A THRESHOLD VAULT

(71) Applicant: nChain Holdings Limited, St. John's (AG)

(72) Inventor: Craig Steven Wright, London (GB)

(73) Assignee: nChain Holdings Ltd., St. John's (AG)

( * ) Notice: Subject to any disclaimer, the term of this patent is extended or adjusted under 35 U.S.C. 154(b) by 0 days.

(21) Appl. No.: 16/639,099

(22) PCT Filed: Aug. 13, 2018

(86) PCT No.: PCT/IB2018/056094
§ 371 (c)(1),
(2) Date: Feb. 13, 2020

(87) PCT Pub. No.: WO2019/034986
PCT Pub. Date: Feb. 21, 2019

(65) Prior Publication Data
US 2020/0213099 A1    Jul. 2, 2020

(30) Foreign Application Priority Data

Aug. 15, 2017 (GB) ...................................... 1713064
Aug. 15, 2017 (WO) .................. PCT/IB2017/054961
(Continued)

(51) Int. Cl.
*H04L 9/08* (2006.01)
*H04L 9/06* (2006.01)
(Continued)

(52) U.S. Cl.
CPC ............ *H04L 9/085* (2013.01); *H04L 9/0637* (2013.01); *H04L 9/088* (2013.01); *H04L 9/3066* (2013.01);
(Continued)

(58) Field of Classification Search
CPC ... H04L 9/3236; H04L 9/3252; H04L 9/3255; H04L 2209/38; H04L 2209/56;
(Continued)

(56) References Cited

U.S. PATENT DOCUMENTS 5,764,767 A    6/1998 Beimel et al.
6,363,481 B1   3/2002 Hardjono
(Continued)

FOREIGN PATENT DOCUMENTS

WO    2015160839    10/2015

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Abu S Sholeman
(74) *Attorney, Agent, or Firm* — Davis Wright Tremaine LLP

(57) ABSTRACT

A method and devices for securely and privately generating a threshold vault address and distributed individual key shares reliant upon individually selected polynomial functions, without revealing the key shares and without ever reconstructing the private key. A digital asset stored at the threshold vault address may be used as an input to a transaction through generating a digital signature corresponding to the threshold vault address. Methods and devices are described for collaboratively generating the digital signature without reconstructing the private key or revealing individual key shares. Methods and devices are described for refreshing the distributed private key shares.

43 Claims, 9 Drawing Sheets

(30) Foreign Application Priority Data

| Sep. 12, 2017 | (GB) | .................................... 1714660 |
| Sep. 12, 2017 | (WO) | ................. PCT/IB2017/055497 |
| Dec. 11, 2017 | (WO) | ................. PCT/IB2017/057782 |
| Jul. 26, 2018 | (WO) | ................. PCT/IB2018/055604 |

(51) Int. Cl.
*H04L 9/30* (2006.01)
*H04L 9/32* (2006.01)

(52) U.S. Cl.
CPC .......... *H04L 9/3236* (2013.01); *H04L 9/3252* (2013.01); *H04L 9/3255* (2013.01); *H04L 2209/38* (2013.01)

(58) Field of Classification Search
CPC ... H04L 9/3239; H04L 9/0643; H04L 9/3263; H04L 9/0037; G06F 21/121; G06F 21/105; G06F 21/602
See application file for complete search history.

(56) References Cited

U.S. PATENT DOCUMENTS

| 6,810,122 | B1 | 10/2004 | Miyazaki et al. |
| 9,288,059 | B2* | 3/2016 | Nix .......................... H04L 9/14 |
| 9,450,938 | B1 | 9/2016 | Lampkins et al. |
| 10,050,779 | B2 | 8/2018 | Alness et al. |
| 10,700,850 | B2* | 6/2020 | Ma ..................... G06F 16/2365 |
| 10,938,549 | B2* | 3/2021 | Ma ....................... G06F 21/554 |
| 2004/0179686 | A1 | 9/2004 | Matsumura et al. |
| 2011/0213975 | A1 | 9/2011 | Sorniotti et al. |
| 2012/0254619 | A1 | 10/2012 | Dhuse et al. |
| 2014/0143369 | A1 | 5/2014 | Dobre |
| 2016/0028698 | A1* | 1/2016 | Anti ...................... G06F 21/606 713/150 |
| 2016/0335440 | A1 | 11/2016 | Clark et al. |
| 2017/0063559 | A1 | 3/2017 | Wallrabenstein |
| 2017/0345011 | A1* | 11/2017 | Salami .................. G06Q 20/10 |
| 2018/0117446 | A1* | 5/2018 | Tran ..................... A42B 3/0433 |
| 2018/0367298 | A1* | 12/2018 | Wright ............... G06Q 20/3829 |

OTHER PUBLICATIONS

Ashwini et al., "Proactive Secret Sharing Using a Trivariate Polynomial," International Journal of Engineering Research and Application, 6(7): Jul. 2016, pp. 69-72.

Backes et al., "Asynchronous MPC with a Strict Honest Majority Using Non-equivocation," International Association for Cryptologic Research, Feb. 17, 2014, 35 pages.

Binu et al., "Threshold Multi Secret Sharing Using Elliptic Curve and Pairing," Mar. 31, 2016, 13 pages.

Bitcoin Forum, "Protocol or Paper for Joint Random Secret Sharing," Bitcoin Talk, retrieved from https://bitcointalk.org/index.php?topic=983665.5, Mar. 9, 2015, 3 pages.

Gennaro et al., "Robust Threshold DSS Signatures," Information and Computation 164, 2001, pp. 54-84.

Green et al., "Strength in Numbers: Threshold ECDSA to Protect Keys in the Cloud," Worcester Polytechnic Institute, retrieved from https://eprint.iacr.org/2015/1169.pdf, 2015, 19 pages.

Ibrahim et al., "A robust threshold elliptic curve digital signature providing a new verifiable secret sharing scheme," 2003 IEEE 46th Midwest Symposium on Circuits and Systems 1:276-280, Dec. 30, 2003.

International Search Report and Written Opinion for Application No. PCT/IB2018/056094, dated Dec. 4, 2018, filed Aug. 13, 2018, 14 pages.

ITFIND, "ITFIND," retrieved from https://www.itfind.or.kr/Report01/200302/IITA/IITA-2381-016/IITA-2381-016.pdf, 2021, 3 pages.

Kate et al., "Distributed Key Generation for the Internet," retrieved from https://www.cypherpunks.ca/~iang/pubs/DKG.pdf, 2009, 10 pages.

Mann et al., "Two-Factor Authentication for the Bitcoin Protocol," retrieved from https://eprint.iacr.org/2014/629.pdf, Nov. 4, 2014, 18 pages.

Maxwell, "Protocol or Paper for Joint Random Secret Sharing (JRSS) . . . ?" Bitcoin Forum, Jan. 15, 2018, 2 pages.

Miyazaki et al., "On Threshold RSA-Signing with No Dealer," International Conference on Information Security and Cryptology, 1999, 13 pages.

Müller, "A Short Note on Secret Sharing Using Elliptic Curves," Proceedings of the International Conference on Security and Cryptography, 2008, pp. 359-362.

Nakamoto, "Bitcoin: A Peer-to-Peer Electronic Cash System," Bitcoin, Oct. 31, 2008, https://bitcoin.org/bitcoin.pdf, 9 pages.

Pratyush et al., "Efficient Weighted Threshold ECDSA for Securing Bitcoin Wallet," Isea Asia Security and Privacy, 2017, 9 pages.

Satoshi et al., "Connection Limits," Bitcoin Forum, Aug. 9, 2010, https://bitcointalk.org/index.php?topic=741.0 prev_next=prev, 2 pages.

Syta et al., "Keeping Authorities "Honest or Bust" with Decentralized Witness Cosigning," IEEE Symposium on Security and Privacy, 2016, 20 pages.

Tang, "ECDKG: A Distributed Key Generation Protocol Based on Elliptic Curve Discrete Logarithm," retrieved from http://citeseerx.ist.psu.edu/viewdoc/download?doi=10.1 1.124.4128&rep=rep1&type=pdf, Dec. 2001, 20 pages.

Zyskind et al., "Decentralizing Privacy: Using a Blockchain to Protect Personal Data," 2015 IEEE CS Security and Privacy Workshops, May 21, 2015, 5 pages.

\* cited by examiner

FIGURE 9

1st nodes          2nd nodes

901 — Distribute shares $x_i, y_i, z_{1i}$

902 — Compute $\mu_i = x_i \cdot y_i + z_{1i}$

903 — Compute $\mu = x \cdot y$

904 — Compute $\mu^{-1} \bmod n = x^{-1} \cdot y^{-1} \bmod n$

905 — Distribute shares $w_i, z_{2i}$

906 — Compute
$\zeta_i = y_i \cdot \mu^{-1} + w_i + z_{2i}$
$= y_i \cdot x^{-1} \cdot y^{-1} + w_i + z_{2i}$ 907 — Receive shares $\zeta_i$ 908 — Compute $\zeta = x^{-1} + w \bmod n$

COMPUTER-IMPLEMENTED METHOD OF GENERATING A THRESHOLD VAULT

BACKGROUND

Shamir [1979] first introduced a dealer based secret sharing scheme that allowed for a distributed management of keys. The problems associated with this scheme come from the necessity of trusting a dealer who cannot be verified. This form of the scheme is fully compatible with the present invention and can be used for group distribution of individual key slices that are created through the process noted herein.

Joint Random Secret Sharing (JRSS) [Pedersen, 1992]

The stated aim of this procedure is to create a method where a group of participants may collectively share a secret without any participant having knowledge of the secret. Each participant selects a random value as their local secret and distributes a value derived from this using Shamir's secret sharing scheme (SSSS) with the group. Each participant then adds all the shares received from the participants, including its own. This sum is the joint random secret share. The randomness offered by a single honest participant is sufficient to maintain the confidentiality of the combined secret value. This state remains true even if all (n−1) other participants intentionally select non-random secret values).

Joint Zero Secret Sharing (JZSS) [Ben-Or, 1988]

JZSS is like JRSS, with the difference that each participant shares 0 as an alternative to the random value. The shares produced using this technique aid in removing any potential weak points in the JRSS algorithm.

Desmedt [1987] introduced the concept of group orientated cryptography. This process allowed a participant to send a message to a group of people in a manner that only allowed a selected subset of the participants to decrypt the message. In the system, the members were said to be known if the sender must know them using a public key and the group is anonymous if there is a single public key for the group that is held independently of the members. The present invention integrates both methodologies and allows for known and anonymous senders and signers to exist within a group simultaneously.

FIELD OF INVENTION

The present application relates generally to the security of data and computer-based resources. More particularly, it relates to Elliptic Curve Cryptography, Elliptic Curve Digital Signature Algorithm (ECDSA) applications, and Threshold Cryptography. For example, the present application describes example processes for securely and secretly collaboratively generating a public-private key pair without any node or third party having the capability of generating the private key itself, while enabling a threshold number of the nodes to generate a digital signature compliant with ECDSA requirements.

In this document the term 'blockchain' is used to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the invention is not limited to use with the Bitcoin blockchain and alternative blockchain implementations and protocols fall within the scope of the present application.

A blockchain is a peer-to-peer, electronic ledger which is implemented as a computer-based decentralised system made up of blocks which in turn are made up of transactions. Each transaction is a data structure that encodes the transfer of control of a digital asset between addresses in the blockchain system, and includes at least one input and at least one output. Each block contains a hash of the previous block to that blocks become chained together to create a permanent, unalterable record of all transactions which have been written to the blockchain since its inception.

The concept of decentralisation is fundamental to the blockchain system. Decentralised systems provide the advantage that, unlike distributed or centralised systems, there is no single point of failure. Therefore, they offer an enhanced level of security and resilience. This security is further enhanced by the use of known cryptographic techniques such as Elliptic Curve Cryptography and ECDSA.

Ownership and control over a digital asset (which can be representative of currency, hard assets, soft assets, computing resources, or any other thing or service) in a blockchain system is controlled through public-private key pairs. An unspent transaction output (UXTO) address is akin to a public key, and control over the asset allocated to that UXTO address is evinced by use of the corresponding private key. To transfer the digital asset by using the UXTO as an input to another transaction, the input must be digitally signed by the corresponding private key. Accordingly, control over the security and secrecy of private keys is fundamental to the security and reliability of the blockchain.

Thus, there is a need for a solution which further enhances the security of such systems. The present application provides such an advantage, amongst others.

SUMMARY OF THE INVENTION

The present application provides method(s) and system(s) as defined in the appended claims.

According to an aspect of the present application, there is provided a computer-implemented method of securely generating a threshold vault, where the threshold vault has a public key address, a private key and a threshold k, each node of a plurality of nodes having a respective first secret and a respective k−1 degree polynomial function with that node's respective first secret set as its free term, the nodes including a first node having a first polynomial function. The method performed by the first node includes, for each other node of the plurality of nodes, setting a variable in the first polynomial function to a value associated with that other node, finding a respective result of the polynomial function for that value, and securely communicating the respective result to that other node. It further includes receiving, from at least a threshold number of the other nodes, respective second secrets, where each of the respective second secrets is a result of that other node's respective polynomial function for a first value associated with said first node; communicating, to the other nodes, an elliptic curve point multiplication of each of the respective results; receiving, from at least the threshold number of the other nodes, elliptic curve point multiplications of the respective second secrets shared by the other nodes with any of the nodes; forming and storing a first private key share of the private key based on a sum of the respective second secrets received from the other nodes; and determining the public key corresponding to the private key based on a sum of the received elliptic curve point multiplications of the respective second secrets and using polynomial interpolation.

In some implementations, each respective polynomial function is selected independently by its respective node, and each respective polynomial function has a different set of coefficients. The polynomials may be of the form:

$$f_i = \sum_{t=0}^{(k-1)} a_t x^t \bmod n$$

In some implementations, the method includes communicating to the other nodes an elliptic curve point multiplication of each coefficient of the first polynomial function. It may further include receiving, from at least the threshold number of other nodes, an elliptic curve point multiplication of each coefficient of their respective polynomial functions. In may yet further include validating the respective second secrets received from the other nodes.

The first private key share may be obtained from the determination of a sum of the form:

$$d_{A(i)} = \sum_{h=1}^{j} f_h(i) \bmod n$$

where $f_i$ is the polynomial function of the ith node, n is an integer order of an elliptic curve, x is the variable in the polynomial function, at is the set of coefficients for the polynomial function, and t is an index.

In some implementations, the method includes modifying the first private key share through collaboratively participating with the other nodes in a dealerless secret distribution of a joint zero secret share whereby the first node receives a first zero secret share and modifies the first private key share by adding the first zero secret share to form and store a modified first private key share.

The step of determining the public key may comprise determining said polynomial function, by means of determining coefficients of the polynomial function from a plurality of known values of the received elliptic curve point multiplications of the respective second secrets.

The step of determining said polynomial function may comprise executing an error correction algorithm.

The step of determining said polynomial function may comprise executing a Berlekamp-Welch decoding algorithm.

The step of determining said polynomial function may comprise:
  defining an error locator polynomial function and a second polynomial function, wherein the second polynomial function is a product of said polynomial function and said error locator polynomial function, determining coefficients of said second polynomial function and said error locator polynomial function from a plurality of known values of the received elliptic curve point multiplications of the respective second secrets, and determining said polynomial function from said second polynomial function and said error detector polynomial function.

In another aspect, the present application discloses a computer-implemented method of securely generating a digital signature for a message relating to a threshold vault, where the threshold vault has a public key address, a private key and a threshold, each node of a plurality of nodes having a respective private key share, ephemeral key share, multiplicative mask share, first additive mask share, and second additive mask share. The method, performed by a first node of the plurality of nodes, includes generating and sharing a double masked key share from the ephemeral key share masked by the multiplicative key share and by the first additive key share, and an elliptic curve point multiplication of the multiplicative key share; receiving from at least a threshold number of other nodes their respective double masked key shares and respective elliptic curve point multiplication (ECPM) of their multiplicative key shares; determining a first signature component using polynomial interpolation over the double masked key shares and polynomial interpolation over the ECPM of the multiplicative key shares; and determining and revealing a second signature component share based on the message, the private key share, the first signature component, the ephemeral key share, masked by the second additive mask share. The second signature component is obtainable from the respective second signature component shares of at least the threshold number of the nodes.

In some implementations, the method includes using dealerless secret distribution to generate the first node's private key share, ephemeral key share, and multiplicative mask share. It may further include using joint zero secret share to generate the first node's first additive mask share and second additive mask share. In some implementations, generating the double masked key share includes determining:

$$\vartheta_i = D_{k(i)} \alpha_i + \beta_i \bmod n$$

where $\vartheta_i$ is the double masked key share, $D_{k(i)}$ is the first node's ephemeral key share, $\alpha_i$ is the first node's multiplicative mask share, $\beta_i$ is the first node's first additive mask share, and n is an integer order of an elliptic curve.

In some implementations, the polynomial interpolation over the double masked key shares results in a multiplicatively-masked ephemeral key, the polynomial interpolation over the ECPM of the multiplicative mask shares results in an ECPM of a multiplicative mask, and determining the first signature component includes determining a product of the ECPM of the multiplicative mask and an inverse of the multiplicatively-masked ephemeral key.

In some implementations, determining the second signature component share, includes determining:

$$s_i = D_{k(i)}(e + d_{A(i)} r) + c_i \bmod n$$

where $D_{k(i)}$ is the first node's ephemeral key share, e is a hash of the message, $d_{A(i)}$ is the first node's private key share, r is the first signature component, $c_i$ is the second additive mask share, and n is an integer order of an elliptic curve.

In yet a further implementation, the method includes determining the second signature component through polynomial interpolation over the second signature component shares of at least the threshold number of the nodes. In some instances, the method includes adding the first signature component and the second signature component to a transaction containing the message and submitting the transaction to a blockchain network.

In a further aspect, the present application discloses a computer implemented method of multi-party computation, the method comprising:
  distributing, among a plurality of first nodes, shares of a plurality of secrets, wherein each said secret is a free term of a respective polynomial function, and each said share is a respective value of the polynomial function associated with said first node, such that the secret is accessible by means of polynomial interpolation of a threshold number of said shares and is inaccessible in the absence of said threshold number of shares;

receiving, at a second node, from each of a plurality of said first nodes, a respective share of a computed secret, wherein each said first node calculates its share of the computed secret by carrying out at least one predetermined computation on shares of a respective plurality of said secrets allocated to said nodes; and determining, at said second node, the computed secret by means of polynomial interpolation of at least a threshold number of said shares of said computed secret.

This provides the advantage of enabling a computation to be carried out, without the first nodes being able to determine the individual secrets or the computed secret.

Each respective polynomial function may be of the form:

$$f_i = \sum_{t=0}^{(k-1)} a_t x^t \bmod n$$

where $f_i$ is the polynomial function of the ith node, n is an integer order of an elliptic curve, x is the variable in the polynomial function, $a_t$ is the set of coefficients for the polynomial function, and t is an index.

The method may further comprise communicating to a plurality of nodes an elliptic curve point multiplication of each coefficient of a plurality of said polynomial functions.

The method may further comprise communicating to a plurality of nodes an elliptic curve point multiplication of a value of at least one said polynomial function associated with each of said plurality of said nodes.

The method may further comprise verifying consistency between an elliptic curve point multiplication of a value of at least one said polynomial function associated with at least one said node and a sum of elliptic curve point multiplications of coefficients of said polynomial function.

This provides the advantage of enabling dishonest participants to be more rapidly identified and excluded from contributing to the polynomial interpolation.

Determining a share of the computed secret may include determining:

$$\mu_i = x_i y_i \bmod n$$

wherein $x_i$ is a share of a first secret, $y_i$ is a share of a second secret and n is an integer order of an elliptic curve.

Determining a share of the computed secret may include determining:

$$x_i + y_i \bmod n$$

wherein $x_i$ is a share of a first secret, $y_i$ is a share of a second secret and n is an integer order of an elliptic curve.

Determining a share of the computed secret may include determining:

$$x_i^{-1} \bmod n$$

wherein $x_i^{-1}$ is a reciprocal, modulo n, of a share of a first secret, and n is an integer order of an elliptic curve.

The method may further comprise providing a modified share of the computed secret by adding a share of a zero secret, wherein the zero secret is a free term of a polynomial function, equal to zero, such that the computed secret is accessible by means of polynomial interpolation of a threshold number of said modified and is inaccessible in the absence of said threshold number of shares.

This provides the advantage of adding further security to the process.

The step of determining the computed secret may comprise determining a polynomial function corresponding to the shares of the computed secret, by means of determining coefficients of the polynomial function from a plurality of known values of the shares of the computed secret. The step of determining said polynomial function may comprise executing an error correction algorithm.

The step of determining said polynomial function may comprise executing a Berlekamp-Welch decoding algorithm.

The step of determining said polynomial function may comprise:

defining an error locator polynomial function and a second polynomial function, wherein the second polynomial function is a product of said polynomial function associated with the shares of the computed secret and said error locator polynomial function, determining coefficients of said second polynomial function and said error locator polynomial function from a plurality of known values of said shares of said computed secret, and determining said polynomial function associated with said shares of said computed secret from said second polynomial function and said error detector polynomial function.

In a further aspect, the present application discloses a computer-implemented method of distributing, among a plurality of nodes, shares of a private key of a public-private key cryptography system, wherein each said node has a respective first secret, a respective first polynomial function with that node's respective first secret set as its free term, and a respective first share of a private key, wherein the private key is the sum of the first secrets and is the free term of a second polynomial function, wherein the private key is accessible by means of polynomial interpolation of at least a threshold number of said first shares and is inaccessible to less than said threshold number of said first shares, the nodes including a first node the method performed by the first node comprising:

selecting a respective third polynomial function having zero set as its respective free term;

for each other node of the plurality of nodes, setting a variable in the third polynomial function to a value associated with that other node, determining a respective result of the third polynomial function for that value, and securely communicating the respective result to that other node;

receiving, from each other node, a respective share of a respective second secret, wherein said share is a result of that other node's respective third polynomial function for a first value associated with said first node; and forming a storing a respective second share of the private key, wherein said second share is the sum of the respective first share and the sum of the received shares of the second secrets.

This provides the advantage of enabling the shares of the private key to be updated, without the necessity of updating the private key itself, thereby enabling malicious or unresponsive participants to be removed.

The method may further comprise communicating, to the other nodes, an elliptic curve point multiplication of each of the respective results; and communicating, to the other nodes, elliptic curve point multiplications of the coefficients of the third polynomial function associated with said first node.

The method may further comprise receiving, from each other node, an elliptic curve point multiplication of the result associated with that node; and receiving, from each other node, elliptic curve point multiplications of the coefficients of the third polynomial function associated with that node.

This provides the advantage of enabling malicious or unresponsive participants to be more easily identified.

The method may further comprise checking consistency of the result associated with at least one other node with the coefficients of the third polynomial function associated with that other node.

The method may further comprise generating a share of a digital signature based on a message and said second share of the private key.

The method may further comprise receiving, from at least a threshold number of nodes, respective shares of a digital signature based on a message and respective second shares of the private key; and generating a digital signature by means of polynomial interpolation of at least a threshold number of said shares of the digital signature.

According to a further aspect of the present application, there is provided a computer implemented system for carrying out a method as defined above.

These and other aspects of the present application will be apparent from and elucidated with reference to, the embodiments described herein.

BRIEF DESCRIPTION OF THE DRAWINGS

An embodiment of the present application will now be described, by way of example only, and with reference to the accompany drawings, in which:

FIG. 9 shows, in flowchart form, an example method of carrying out multi-party computation using the threshold vault of the invention.

DETAILED DESCRIPTION

Figure 1:
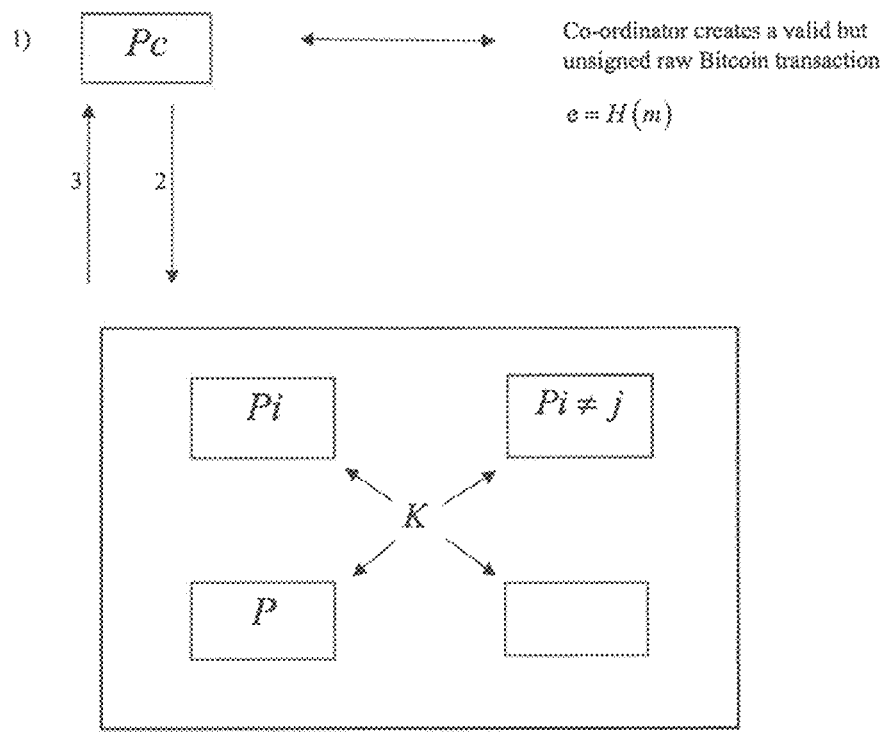
FIG. 1 illustrates part of an example elliptic curve digital signature process.

The invention provides a novel and inventive technique which can be used to enhance the security of computer systems and resources which need to be protected from unauthorised access. The following description provides implementations, use cases and illustrations relating to cryptocurrency-related systems, including Bitcoin. However, it is important to note that the invention has a wider applicability and may be used to secure other types of systems and computer-based resources, and the invention is not limited in this regard.

Embodiments of the invention provide improved security by allowing for the addition of group-based threshold cryptography, coupled with the ability for deployment without a dealer. Embodiments also support the non-interactive signing of messages and provide for the division of private keys into shares that can be distributed to individuals and groups. Moreover, the invention provides a solution which creates a distributed key generation system that removes the necessity for any centralised control list minimising any threat of fraud or attack. In the application of threshold based solutions for DSA to ECDSA, the invention provides an entirely distributive signature system that mitigates against any single point of failure.

When used in relation to Bitcoin or an alternative, it can be coupled with retrieval schemes involving CLTV and multisig wallets to an infinitely extensible and secure means of deploying cryptocurrencies. Using group and ring based systems, the invention can be utilised to implement blind signatures against issued transactions.

The present application discloses a threshold based dealerless private key distribution system that is fully compatible with Bitcoin. The system builds on a group signature scheme that departs from the traditional individual signing systems deployed within Bitcoin wallets. As deployed, the system is both extensible and robust tolerating errors and malicious adversaries. The system is supportive of both dealer and dealerless systems and deployment in an infinitely flexible combination of distributions.

Individual parties can act as single participants or in combination as a dealer distributing slices of their protected key slice across machines for security and recoverability or in groups for the vote threshold based deployment of roles and access control lists.

There is no limit to the depth of how far a slice can be divided. This issue of complexity needs to be weighed against the distinct deployment. In this manner, as the record of signing and transactions can be hidden using this methodology from outside participants all with extensions to be presented in a subsequent paper even from those within the groups, embodiments of the invention introduce a level of anonymity and plausible deniability into Bitcoin transactions increasing the standard of pseudonymous protection to the users.

Ibrahim et al. [2003] developed an initial robust threshold ECDSA scheme. The following protocol is a further extension of what forms the elliptic curve form of the threshold DSS introduced by Gennaro et al. [1996].

TABLE 1

| | Definitions |
|---|---|
| m | The message incl. Bitcoin transaction |
| e = H (m) | The hash of the message |
| CURVE | The elliptic curve and field deployed (summarised as E) |
| G | The elliptic curve base point. This point is a generator of the elliptic curve with large prime order n |
| n | Integer order of G such that n x G = 0. This is defined as the number of rational points that satisfy the elliptic function and represents the order of the curve E. |

TABLE 1-continued

| | Definitions |
|---|---|
| k | The threshold value for the key splitting algorithm. This value represents the number of keys needed to recover the key. The secret is safe for (k − 1) shares or less and hence can be retrieved with k shares. |
| $d_A$ | A private key integer randomly selected in the interval [1, (n − 1)] |
| $Q_A$ | The public key derived from the curve point $Q_A = d_A \times G^1$ |
| × | Represents elliptic curve point multiplication by a scalar |
| j | The number of participants in the scheme. |

The use of group mathematics allows the creation a verifiable secret sharing scheme (VSS) that extends the work of Shamir [1979] in secret hiding and that of Feldman [1987] and Pedersen [1992] from RSA and DSA schemes so that it can be used within ECC and ECDSA-based Signature systems such as Bitcoin [Koblitz, 1998]. Embodiments of the present invention are tolerant against malicious adversaries, halting and are robust against eavesdropping.

The present disclosure begins with a presentation of a method to allow for the cooperative signing of ECDSA signatures where no one-party ever knows the private key. Moreover, it allows for the private key pairs to be updated and refreshed without the necessity of changing the private key. This is a significant technical advantage.

Existing solutions all require a trusted party. Utilising the present invention also allows the extension of the work of Chaum [1983] from a centralised system into a truly distributed manner of issuing electronic notes that can be settled directly on the Bitcoin Blockchain making the requirements for alternative Blockchains or sidechains obsolete.

With regard to the generator point G mentioned above, Bitcoin uses secp256k1. This defines the parameters of the ECDSA curve used in Bitcoin, and may be referenced from the Standards for Efficient Cryptography (SEC) (Certicom Research).

Matters of Trust

All existing systems require some level of trust. Until this time, Bitcoin has needed the protection of a private key using a secure system that is isolated from the world, which has proven difficult to achieve. Of note, systems where Bitcoin can be exchanged or stored, require trust in a centralised authority. The invention changes this requirement entirely distributing and decentralising the key creation and message signing processes within Bitcoin while not changing any of the core requirements of the protocol. The methodologies noted herein may be implemented without modifying the Bitcoin protocol and in fact, there is no way to determine whether this process has been deployed through the analysing of a signed message.

In creating a distributed signature scheme for Bitcoin, the invention allows for a group of people or systems to securely hold a key in a way that leaves no individual capable of generating a signature on their own. When extended, this scheme also allows for the secure recovery of each of the shares as well as the Bitcoin private key itself. The group generated signature is indistinguishable from that generated from the existing protocol. As such signature verification remains as if it was enacted through a single person signer using a standard transaction.

This increase in trust is achieved as the secret key is shared by a group of n participants or m groups of participants. A threshold number of participants is required for the signing of a transaction, and any coalition of participants or groups of participants that meet the minimum threshold can perform the signature operation. Importantly, this protocol can be enacted synchronously or as a batched process where individuals or groups can attempt to create a coalition of participants.

The Present Invention

For any elliptic curve (CURVE) with a large order prime, and a base point G∈CURVE ($Z_p$) of order n defined over the prime field $Z_p$, a system can be created that allows for the secure distribution of an ECC private key into key shares and its use without any participant being able to recreate the original private key from less than a threshold of shares.

For an unknown integer $d_A$ where $1 \le d_A \le (n-1)$ it is known that it is extremely difficult to calculate $d_A$ given $Q_A = d_A \times G$ [Kapoor, 2008].

The fundamental technique of the present invention is derived using the application of threshold cryptography. In this system, the ECDSA private key only exists as a potential and need never be recreated on any system. Each of these multiple shares is distributed to multiple participants [$p_{(i)}$] in a manner that is extensible and allows for the introduction of both group and individual party signature formats. Thus, the signing process differs from that deployed within Bitcoin. In this process, a coordinating participant $p_{(c)}$ creates a transaction and a message signature that is distributed to the group. Each participant can vote on the use of its private key share by either computing a partial signature or passing.

In effect, passing would be equivalent to a no vote. The coordinating participant $p_{(c)}$ will collate the responses and combine these to form a full signature if they have received the minimum threshold number of partial signatures.

The coordinating participant $p_{(c)}$ can either accept the no vote and do the calculation based on a null value from the other party or can seek to lobby the party and convince them to sign the message. The protocol can be implemented with a set coordinator, or any individual or group can form this role and propose a transaction to the threshold group to be signed. The present invention extends the work of Ibrahim et al. [2003] providing a completely distributed ECDSA private key generation algorithm. The application also presents a distributed key re-sharing algorithm and a distributed ECDSA signing algorithm for use with Bitcoin. The key re-sharing algorithm may be used to invalidate all private key shares that currently exist in favour of new ones or for the reallocation of private key shares to new participants. This protocol extends to the sharing of not only the ECDSA private key but to private key shares as well. The consequences of this mean that shares can be constructed and voted on as a group process.

The present invention removes all requirements for a trusted third party to exist. Consequently, it is possible to create the new overlay and wallet for Bitcoin that is entirely compatible with the existing protocol and yet removes any remaining single points of failure while also allowing greater extensibility. The invention can also be extended to allow for the introduction of blind signatures.

As the present invention does not require a private key ever to be loaded into memory, the invention not only removes the need for a trusted third party but further removes a broad range of common attacks. The protocol is extensible allowing the required number of shares and the distribution of shares to be decided by the use case, economic scenario and risk requirements.

The present invention mitigates all side channel attacks and thus any cache timing attacks. This system takes the work of Gennaro et. al. [1996] and extends it from DSS such that it can be successfully used in any ECDSA based application.

ECDSA

Bitcoin uses ECDSA based on the secp256k1 curve. ECDSA was first standardised by NIST in 2003 [NIST] varying the requirements for Diffie-Hellman-based key exchanges using elliptic curve cryptography (ECC). The creation of ECC was particularly important due to the reduction in key size and processing power when compared to other public/private key systems. No sub-exponential time algorithm has been discovered for ECDLP. ECDLP is known to be intractable and refers to the elliptic curve discrete logarithm problem [Johnson, 2001].

The parameters used throughout the present application are documented in Table 1 provided above.

Security Considerations

The system is bounded by the security of ECDSA which is a current limitation within Bitcoin. At present, ECDSA remains secure if a private key can be securely deployed. The invention mitigates side channel attacks and memory disclosure attacks up to the threshold value requiring that the threshold number of participants have been compromised before the rekeying event. Additionally, any uncompromised threshold majority will be able to identify compromised participants at less than the threshold value.

Halting Problems

Service disruption is a form of attack that can be engaged in by a malicious adversary attempting to create a denial of service attack against the participants. This attack would require the participants to either receive invalid signatures that they would expend processing time analysing or through flooding network messages that would be subsequently dropped.

The requirement to encrypt messages to the participants using either ECC or signcryption based ECC mitigates this attack vector. Before an attacker can send invalid partially signed messages, they would need to have already compromised a participant, making this form of attack no longer necessary.

Randomness

Algorithm 2 provides a scenario where sufficient randomness is introduced even if (n−1) participants fail to choose random values. A possible addition to this protocol is the introduction of group oracles designed solely for the introduction of random values to the signing and rekeying process. In this optional scenario, each of the key slices can be generated using the same protocol. For instance, if there is an m of n primary slice requirement, each of the underlying key slices can also be generated and managed using an m' of n' threshold condition.

A participant using this system would be able to have the addition of an external Oracle that does nothing other than injecting randomness into the protocol. A user with m' key slices (where m'<n−1) could choose to recreate and process their signature solution based on the key slices they hold or may introduce an external Oracle that is unnecessary other than for the introduction of randomness.

Each slice could be likewise split for robustness and security. The key slice could be distributed such that the user has a slice on an external device such as a mobile phone or smartcard and a software program running on a computer such that the combination of sources would be required for them to create a partial signature.

It is important that a unique random ephemeral key $D_k$ is produced or it would be possible to use the information to recreate the private key $d_A$.

Public Signing

The primary purpose of transactional signing using this protocol is to enable the distributed signing of the Bitcoin transaction. Any transaction that has not been published to the Blockchain can be maintained privately by the participants. Therefore, if a coordinating participant $p_{(c)}$ on any occasion has not been able to achieve the required level of votes to sign a transaction successfully, it is not necessary to create a new Bitcoin transaction. The ownership of any settled transaction remains secure if the key slices are themselves secure to the threshold value.

If the system is deployed well, the ability to compromise up to (k−1) participants leaves the system secure to attack below the threshold value. When coupled with a periodic rekeying protocol (Algorithm 2), embodiments of the present invention can withstand side channel attacks and memory disclosures.

Methods and Implementations of the Present Invention

As embodiment of the present invention encrypt the secret information required to be sent between participants using ECC based on a hierarchical derivation [Wright, 2016] it is both possible and advisable to collate all messages into a single packet sent to all users such that validation can be done against potentially compromised or hostile participants when necessary. Signature generation is proposed by a coordinating participant $p_{(c)}$. By default, any key slice can act as the coordinating participant and the requirements come down to the individual implementation of the protocol. The algorithms used are documented below, and a later section provides detail as to their deployment.

| Algorithm 1 | Key Generation |
|---|---|
| Domain Parameters (CURVE, Cardinality n, Generator G) | |
| Input: | NA |
| Output: | Public Key QA |
| | Private Key Shares $d_{A(1)}, d_{A(2)}, \ldots, d_{A(j)}$ |

For a threshold of k slices from (j) participants, a constructed key segment $d_{A(i)}$ is constructed which is associated with participant (i) and (j−1) participants nominated as participant (h) that are the other parties that participant (i) exchanges secrets with to sign a key (and hence a Bitcoin transaction).

In the scheme, j is the total number of participants where
  k≤j and hence h=j−1
Hence, there is a (k,j)-threshold sharing scheme.
The method for algorithm 1 follows:
1) Each participant $p_{(i)}$ of (j) where 1≤i≤j exchanges an ECC public key (or in this implementation, a Bitcoin address) with all other participants. This address is the Group identity address and does not need to be used for any other purpose.

It should be noted that this is a derived address and key based on a shared value between each of the participants from the process of international patent application WO 2017/145016.
2) Each participant $p_{(i)}$ selects a polynomial $f_i(x)$ of degree (k−1) with random coefficients in a manner that is secret from all other parties.

This function is subject to a first secret value in the form of the participant's secret $a_0^{(i)}$ that is selected as the polynomial free term. This value is not shared. This value is calculated using a derived private key, as disclosed in WO 2017/145016.

$f_i(h)$ is defined to be the result of the function, $f_{(x)}$ that was selected by participant $p_{(i)}$ for the value at point (x=h), and the base equation for participant $p_{(i)}$ is defined as the function:

$$f_{(x)} = \sum_{p=0}^{(k-1)} a_p x^p \bmod n$$

In this equation, $a_0$ is the secret for each participant $p_{(i)}$ and is not shared.

Hence, each participant $p_{(i)}$ has a secretly kept function $f_i(x)$ that is expressed as the degree (k-1) polynomial with a free term $a_0^{(i)}$ being defined as that participant's secret such that:

$$f_{i(x)} = \sum_{y=0}^{(k-1)} a_y x^y \bmod n$$

3) Each participant $p_{(i)}$ encrypts first shares $f_i(h)$ to participant $P_{(h)}$ $\forall h=\{1, \ldots, (i-1), (i+1), \ldots, j\}$ using $p_{(h)}$'s public key, as disclosed in WO 2017/145016, as noted above and exchanges the value for $p_{(h)}$ to decrypt.

It should be noted that that $n \times G = \emptyset$ for any basic point $G \in E(Z_p)$ of order n for the prime p. In the case of Bitcoin the values are:

Elliptic curve equation: $y^2 = x^3 + 7$
Prime modulo: $2^{256} - 2^{32} - 2^9 - 2^8 - 2^7 - 2^6 - 2^4 - 1$=FFFFFFFF FFFFFFFF FFFFFFFF FFFFFFFF FFFFFFFF FFFFFFFF FFFFFFFE FFFFFC2F
Base point=04 79BE667E F9DCBBAC 55A06295 CE870B07 029BFCDB 2DCE28D9 59F2815B 16F81798 483ADA77 26A3C465 5DA4FBFC 0E1108A8 FD17B448 A6855419 9C47D08F FB10D4B8
Order=FFFFFFFF FFFFFFFF FFFFFFFF FFFFFFFE BAAEDCE6 AF48A03B BFD25E8C D0364141

As such for any set of integers B: $\{b_i \in Z_n\}$ that can be represented as $(b, b_1, b_2, \ldots)$, if $bG = [b_1 G + b_2 G + \ldots] \bmod p$, then $b = [b_1 + b_2 + \ldots] \bmod n$. Further, if $bG = [b_1 b_2 \ldots]G \bmod p$ then $b = [b_1 b_2 \ldots] \bmod n$.

Given that $Z_n$ is a field and Lagrange interpolation modulo n can be validly done over the values selected as ECC private keys, there is a condition which leads to the conclusion that Shamir's Secret Sharing Scheme SSSS [5] can be implemented over $Z_n$.

4) Each participant $P_{(i)}$ broadcasts the values below to all participants.
 a) $a_k^{(i)} G$ $\forall_K = \{0, \ldots, (k-1)\}$
 b) $f_i(h)G$ $\forall h=\{1, \ldots, j\}$ The value associated with the variable h in the equation above can either be the position of the participant $P_{(h)}$ such that if participant $P_{(h)}$ represents the third participant in a scheme, then h=3 or equally may represent the value of the ECC public key used by the participant as an integer. Use cases and scenarios exist for either implementation. In the latter implementation, the value $h=\{1, \ldots, j\}$ would be replaced by an array of values mapped to the individual participant's utilised public key.

5) Each participant $P_{(h \neq i)}$ verifies the consistency of the received shares with those received from each other participant.

That is:

$$\sum_{k=0}^{(k-1)} h^k a_k^{(i)} G = f_i(h)G$$

And that $f_i(h)G$ is consistent with the participant's share.

6) Each participant $P_{(h \neq i)}$ validates that the share owned by that participant ($P_{(h \neq i)}$) and which was received is consistent with the other received shares:

$$a_0^{(i)} G = \Sigma_{h \in B} b_h f_i(h) G \ \forall P_{(h \neq i)}$$

In effect, this step consists of carrying out, on the elliptic curve encrypted versions of the shares $f_i(h)$ (i.e. $f_i(h)G$), the operation which, if carried out on the unencrypted versions of $f_i(h)$, would recover the secret value $a_0^{(i)}$, to recover G $a_0^{(i)}$. In the case of a Shamir secret sharing scheme, therefore, the coefficients $b_h$ represent the Lagrange interpolation coefficients necessary to recover the secret from its corresponding shares. If this is not consistent, the participant rejects the protocol and starts again.

7) Participant $p_{(i)}$ now either calculates their share $d_{A(i)}$ as:

$$\text{SHARE}(p_{(i)}) = d_{A(i)} = \Sigma_{h=1}^j f_h(i) \bmod n$$

Where $\Sigma_{h=1}^j f_h(i) \bmod n$ are second shares in respective second secret values $a_0$ received from each participant $P_{(h \neq i)}$ And where: $\text{SHARE}(p_{(i)}) \in Z_n$ and $d_{A(j)}$ Where: $Q_A = \text{Exp-Interpolate}(f_1, \ldots, f_j) \triangleright [= G \times d_A]$ And where the operation Exp-Interpolate( ) is defined as the operation which recovers the elliptic curve encrypted secret from the elliptic curve encrypted shares. This operation can be defined in more detail as follows.

If $\{\omega_1, \ldots, \omega_j\}(j \geq (2k-1))$ is a set where at most (k-1) values are null and the remaining values are of the form $G \times \alpha_i$, and each $\alpha_i$ exists on some (k-1)-degree polynomial $H(\cdot)$, then $\theta = G \times H(0)$.

This value can be computed by $\theta = \Sigma_{i \in V} \omega_i \times \lambda_i = \Sigma_{i \in V}(G \times H(i)) \times \lambda_i$ $\beta$ for which V is a (k)-subset of the correct $\omega_i$ values and further, $\lambda_A$ represent the resultant Lagrange interpolation coefficients. The polynomial can be computed by using the Berlekamp-Welch decoder.

Return $(d_{A(i)}, Q_A)$

Where $d_{A(i)}$ is third share of a third secret value.

Participant $p_{(i)}$ now uses the share in calculating signatures. This role can be conducted by any participant or by a party $p_{(c)}$ that acts as a coordinator in the process of collecting a signature. The participant $p_{(c)}$ can vary and does not need to be the same party on each attempt to collect enough shares to sign a transaction.

Hence private key shares $d_{A(i)} \leftarrow Z^*_n$ have been created without knowledge of the other participant's shares.

| Algorithm 2 | Updating the private key |
|---|---|
| Input: | Participant $P_i$'s share of private key $d_A$ denoted as $d_{A(i)}$. |
| Output: | Participant $P_i$'s new private key share $d_{A(i)}$. |

Algorithm 2 can be used to both update the private key as well as to add randomness into the protocol.

Using keys of the format of [Wright, 2016], this process can lead to the recalculation of hierarchical sub-keys without the reconstruction or even calculated existence of the private keys.

In this manner, it is possible to construct hierarchies of Bitcoin addresses and private key slices that when correctly deployed will remove any large-scale fraud or database theft as has occurred in the past.

1) Each participant selects a random polynomial of degree (k−1) subject to zero as its free term. This is analogous to Algorithm 1 but that the participants must validate that the selected secret of all other participants is zero.
   It should be noted that: $\emptyset G=nG=0$ where 0 is a point at infinity on the elliptic curve.
   Using this equality, all active participants validate the function:

$$a_0^{(i)} G = \emptyset \forall i = \{1, \ldots, j\}$$

See Feldman (1987) for an analogy.
   Generate the zero share: $z_i \leftarrow Z^*_n$
2) $d_{A(i)}' = d_{A(i)} + z_i$
3) Return: $d_{A(i)}'$ The result of this algorithm is a new key share that is associated with the original private key. A variation of this algorithm makes the ability to both increase the randomness of the first algorithm or to engage in a re-sharing exercise that results in new key slices without the need to change the bitcoin address possible. In this way, the invention allows a group to additively mask a private key share without altering the underlying private key. This process can be used to minimise any potential key leakage associated with the continued use and deployment of the individual key shares without changing the underlying bitcoin address and private key.

| Algorithm 3 | Signature Generation | |
|---|---|---|
| Domain Parameters: CURVE, Cardinality n, Generator G | | |
| Input: | Message to be signed | e = H(m) |
| | Private Key Share | $d_{A(i)} \in Zn$ |
| Output: | Signature | $(r,s) \in Z_n^*$ for e = H(m) |

A) Distributed Key Generation
1) Generate the ephemeral key shares using Algorithm 1:

$$D_{k(i)} \leftarrow Z^*_n$$

2) Generate Mask shares using Algorithm 1:

$$\beta_i, c_i \leftarrow Z_n^2$$

3) Generate Mask shares with Algorithm 2:

$$\beta_i, c_i \leftarrow Z_n^2$$

By executing Algorithm 2 twice using polynomials of degrees 2(k−1). The shares created in these protocols are denoted as $$(\beta_1, \ldots, \beta_j) \xrightarrow{(2(k-1),j)} \beta \bmod n \text{ and}$$

$$(c_1, \ldots, c_j) \xrightarrow{(2(k-1),j)} c \bmod n.$$

These are used as additive masks. The polynomial must be of degree 2(k−1) because the numbers being masked involve the products of two polynomials of degree (k−1). This doubles the required number of shares needed to recover the secret.

The shares of β and c are then kept secret by the participants.

B) Signature Generation
4) e=H(m) Validate the hash of the message m
5) Broadcast $$\vartheta_i = D_{k(i)} \alpha_i + \beta_i \bmod n$$

And $$\omega_i = G \times \alpha_i$$

6) $\mu =$Interpolate $(\vartheta_1, \ldots, \vartheta_n)$ mod n

▷ $[=D_k \alpha \bmod n]$

Where the operation $\mu=$Interpolate $(\vartheta_1, \ldots \vartheta_n)$ mod n is defined as the operation which recovers the secret from the shares. This operation can be defined in more detail as follows:
   Where $\{\vartheta_1, \ldots, \vartheta_n\}$ (j≥(2k−1)) forms a set, such that at most of (k−1) are null and all the residual values reside on a (k−1)-degree polynomial F(·), then $\mu=F(0)$.

7) $\theta=$Exp–Interpolate $(\omega_1, \ldots, \omega_n)$

▷ $[=G \times \alpha]$

8) Calculate $(R_x, R_y)$ where $r_{x,y} = (R_x, R_y) = \theta \times \mu^{-1}$

▷ $[=G \times D_k^{-1}]]$

9) $r=r_x=R_x$ mod n
   If r=0, start again (i.e. from the initial distribution)
10) Broadcast $s_i = D_{k(i)}(e + d_{A(i)} r) + c_i$ mod n
11) S=Interpolate $(s_i, \ldots, s_n)$ mod n
    If s=0 redo Algorithm 3 from the start (A.1).
12) Return (r,s)
13) In Bitcoin, reconstruct the transaction with the (r,s) pair to form a standard transaction.

Figure 10:
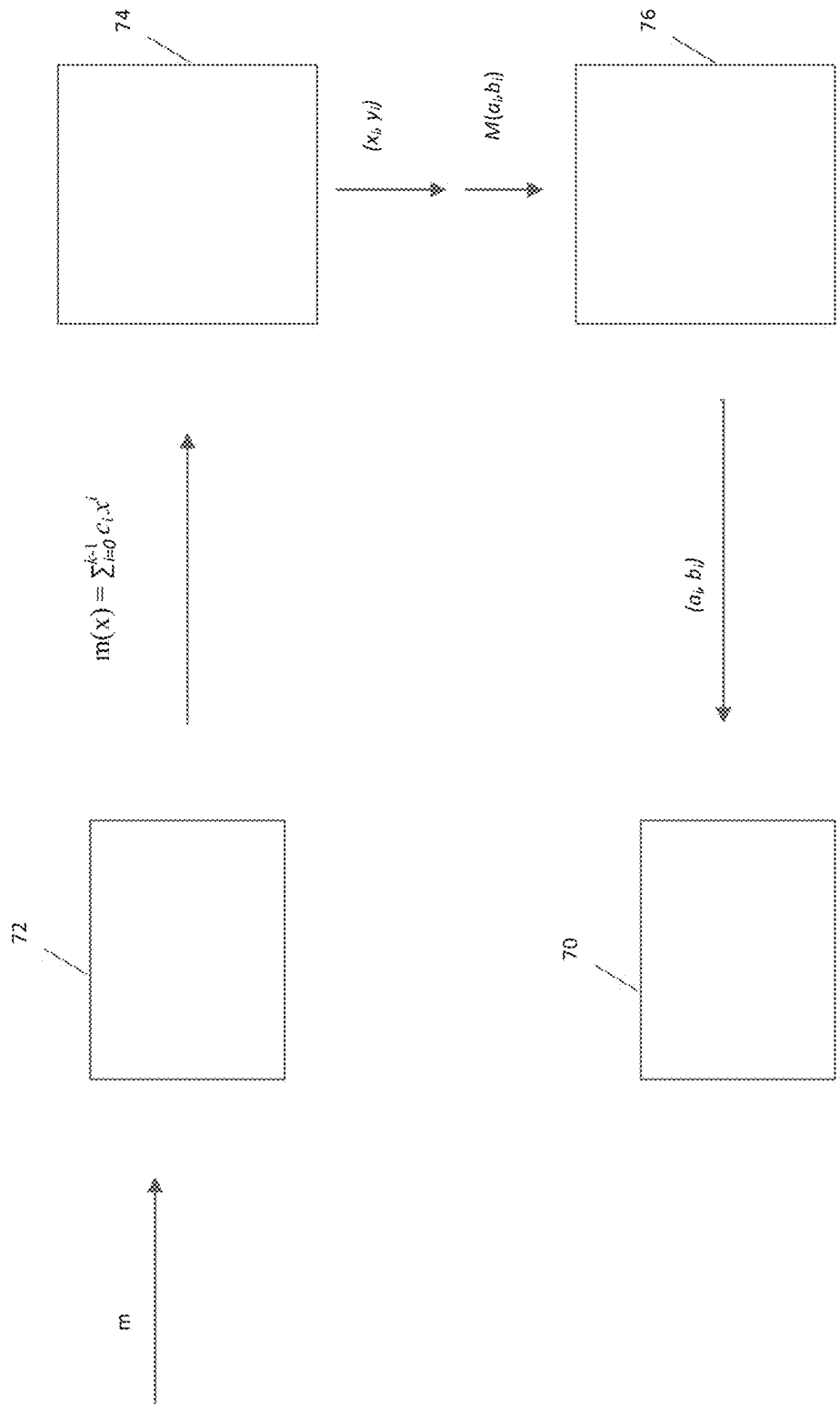
FIG. 10 shows a Berlekamp-Welch decoder for carrying out polynomial interpolation in a method embodying the present invention.

FIG. 10 shows a novel use of a conventional Berlekamp-Welch decoder 70 to obtain a polynomial function representing partial signatures of a digital message.

In conventional use of the Berlekamp-Welch algorithm for correcting errors in transmitted data, a message m is divided into a series of k bytes at an encoder 72, and each byte $c_0, c_1, \ldots C_{k-1}$ is encoded as an integer modulo p. The message is then represented by a polynomial function:

$$m(x) = \Sigma_{i=0}^{k-1} c_i x^i$$

The value of polynomial function m(x) is then determined for a number of known values of x to generate a series of (x, y) pairs, which are then transmitted by a transmitter 74 to a receiver 76.

The data M received at the receiver 76 (i.e. the received message) comprises pairs $(a_1, b_1, \ldots a_n, b_n)$ corresponding to points on the polynomial function representing the original message $$P(x) = m(x) = \Sigma_{i=0}^{k-1} c_i x^i$$

If it is assumed that some of the transmitted (x, y) pairs have been corrupted during transmission, then an error locator polynomial function can be defined as follows:
$E(a_i)=0$, when $P(a_i) \neq b_i$; otherwise $E(a_i) \neq 0$
If a product polynomial function $Q(a_i)$ is defined as $$Q(a_i) = b_i E_i(a_i)$$

Then for each received ($a_i$, $b_i$) pair, regardless of whether the value of $b_i$ has become has been corrupted $Q(a_i)=b_i E_i(a_i)=P(a_i)E_i(a_i)$, since $E(a_i)=0$, when $P(a_i) \neq b_i$ For n known values of ($a_i$, $b_i$), since $E(a_i)$ is a polynomial function of degree e, and $P(a_i)$ is a polynomial function of degree (k−1)), then $Q(a_i)$ is a polynomial function of degree (e+k−1). The known values of ($a_i$, $b_i$) can therefore be expressed as the linear system:

$$Q(a_i) = \sum_{j=0}^{e+k-1} q_i a_i^j = b_i \sum_{j=0}^{e} e_j a_i^j = b_i E_i(a_i)$$

The linear system contains 2e+k−1 unknown terms (e from E(x) and e+k−1 from Q(x)), as a result of which the coefficients of $Q(a_i)$ and $E(a_i)$ can be determined if n≥2e+k−1. If $Q(a_i)$ and $E(a_i)$ can be determined, it is possible to determine $P(a_i)$ to recover the original message m(x).

It can therefore be seen that the Berlekamp-Welch decoder 70 receives as inputs pairs representing points on a polynomial function, and outputs the polynomial function. The decoder 70 can therefore be used as a replacement for Lagrange interpolation in the present invention to determine a polynomial function from a threshold number of shares represented by that polynomial function.

The Model—Threshold ECDSA (T.ECDSA)

In accordance with an embodiment of the invention, the system of n groups or individuals that are designated as participants is allowed for. Each player can be an individual as a sole participant or a group or combination of the above. Participant $p_{(i)}$ may be mapped against an identity using a commonly derived public key calculation or participant $p_{(i)}$ may be left as a pseudonymous entity with the public key of the participant used only for this protocol without being mapped back to the individual.

The invention introduces a dedicated broadcast channel allowing for the recognition of other participants as a valid player and a member of the scheme while simultaneously allowing members within the group to remain unidentified. When a message is broadcast from participant $p_{(i)}$, the members within the group will recognise the message as coming from an authorised party without necessarily being able to identify the end user or individual that is associated with the key. It is also possible to link the identity of the key to an individual if such a system were warranted.

Figure 2:
FIG. 2 illustrates a further part of the example elliptic curve digital signature process.

The process flow is summarised as follows:
In FIG. 1:
Step 1)
See FIG. 1
Step 2) Pc sends the raw transaction to the Group. If this validates (i.e. the raw transaction matches the Hash to be signed), the participant votes by signing it.
Step 3) If Yes, each Participant returns the partially signed transaction.
See FIG. 2
Step 4) Pc (or any other Participant) reconstructs the complete signature if a threshold of partially signed transactions are received.
Step 5) Pc broadcasts the transaction as a signed Bitcoin transaction.

The calculation of a message signature can be initiated by an individual who does not change, or through a temporary broadcasting party. The role of the protocol coordinator can be conducted by any participant or by a party $p_{(c)}$ that acts as a coordinator in the process of collecting a signature.

Key Generation

A modified ECDSA key generation algorithm is used to make a signature scheme that is fully distributed. In this scheme, the private key is communally selected by the distributed group using a combination of hidden random secrets.

The threshold key derivation algorithm is given in Algorithm 1.

The algorithm is extensible, and each step of the algorithm can be executed by every participant synchronously without a dealer or in groups or individuals or dealers. This implementation is fully compatible with the current Bitcoin protocol. Any signatories will appear to an outside observer or verifier as if they were signed in the standard manner. Consequently, there is no way to tell if a key has been generated in the standard format or using the enhanced protocol of the present invention.

Signature Generation

The concept of threshold signature generation is described in [Shamir, 1979]. Algorithm 3 is related to a procedure reported in [Feldman, 1987] that was based on DH based systems and has been modified to allow for ECDSA.

The present invention extends this process such that it is fully compatible with both Bitcoin transaction processing and signing. This also extends to multisig transactions where it is possible to require distributed keys for each of the multiple signatures that are necessary.

Re-Sharing the Private Key

This process can be extended to introduce an entirely distributed key re-sharing scheme. This re-distribution is completed when the current participants execute one round of Algorithm 2 adding the resulting zero-share to the participant's private key share. The new shares will be randomly distributed if one participant has introduced a random value.

This process allows additive masking of the private key share while not altering the actual private key.

Threshold ECDSA Signature Derivation

The threshold ECDSA signature creation system is derived using the ideas related to the threshold DSS signature generation protocol found in [Feldman, 1987] which followed the scheme developed in [Shamir, 1979].

Verification

The present invention allows for the off-line signing and verification of messages before any value is transferred to a known bitcoin address. Each of the parties can calculate and validate an address independently using the processes noted in Algorithm 1. Hence, all participants can be aware that their share is valid before any exercise that requires funding a Bitcoin address. For this process, although verification schemes are possible, they are unnecessary. Any threshold participant who chooses to send an invalid signature slice is in effect voting for the negative. That is, a vote to not sign the message and hence not complete the transaction in bitcoin is achieved from inaction. The impact is as if they did not sign a message at all.

Algorithm 2 provides a method where participants can have their share consistency verified. If a threshold of non-malicious participants has been maintained, it is possible to exclude any known malicious participants on rekeying. Hence key slices can be updated while not allocating fresh slices to known malicious participants, allowing for the refreshing of the key in a manner that also allows for reallocations of slices.

In environments where trust is particularly scarce and malicious adversaries are to be expected as the norm, it is possible to further enhance the robustness of the verification process increasing the ability to defend against an j/2 passive and an j/3 active adversary [Ben-Or, 1989; Rabin, 1988] when completing secure multiparty computations.

The robustness of the system can be enhanced using the additional process:

1. Let $D_a$ be the secret shared among the j participants on a polynomial A(x) of degree (k−1).
2. Separately participants $p_{(i)}$ have a share $D_{a(i)}$ of $D_a$ and $D_{a(i)}G \forall (i \in 0, \ldots, j)$ which are made available to the group.
3. All participants next share a secret b using Algorithm 2 such that each participant $p_{(i)}$ has a new hidden share $D_{b(i)}$ of $D_b$ on a polynomial of degree (k−1).
   It should be noted that $D_{b(i)} = \Sigma_{h=1}^{j} D_{b(i)}^{(h)}$, where $D_{b(i)}^{(h)}$ is the sub-share submitted to participant $p_{(i)}$ from participants $p_{(h \neq i)}$.
4. The participants use Algorithm 2 so that each participant $p_{(i)}$ has a new hidden share $Z_{(i)}$ on a polynomial of degree (2k−1) of which the free term equals zero.
5. Each participant $p_{(i)}$ publishes $D_{a(i)} D_{b(i)}^{(h)} G \forall$ (h∈0, . . . , j) and $D_{a(i)} D_{b(i)} G$ to the group.
6. Each participant $p_{(h \neq i)}$ can verify the validity of $D_{a(i)} D_{b(i)}^{(h)} G$ as they have $D_{b(i)}^{(h)}$ and $D_{a(i)} G$
7. Also, participant $p_{(i)}$ can further verify that $D_{a(i)} D_{b(i)} G = \Sigma_{h=1}^{j} D_{a(i)} D_{b(i)}^{(h)}$.

Any participants can determine if other participants are acting maliciously with this system.

Distributed Key Generation

It is possible to complete the implementation of both distributed autonomous corporations (DACs) and distributed autonomous social organisations (DASOs) in a secure manner through this scheme. It has been shown that any k members can represent such a group through an identification scheme (including through digital certificates signed and published by a certification authority) and that any k members can construct a digital signature on behalf of the organisation. This system extends to the signing of Bitcoin transactions that verify without any distinguishing feature and provide for the transfer of value. These authentication schemes are proven secure.

Method and Implementation

As the protocol encrypts the secret information required to be sent between participants using ECC based on the technique disclosed in international patent application WO 2017/145016, it is both possible and advisable to collate all messages into a single packet sent to all users such that validation can be done against potentially compromised or hostile participants when necessary.

Signature generation is proposed by a coordinating participant $p_{(c)}$. By default, any key slice can act as the coordinating participant and the requirements come down to the individual implementation of the protocol. On the creation of a valid raw transaction by $p_{(c)}$, the transaction and the message hash of the transaction are broadcast to all participants $p_{(i \neq c)}$ using an encrypted channel.

A. Generate Ephemeral Key Shares $D_{k(i)}$

The participants generate the ephemeral key $D_k$, uniformly distributed in $Z^*_n$, with a polynomial of degree (k−1), using Algorithm 1, which creates shares $$(D_{k(1)}, \ldots, D_{k(j)}) \xleftrightarrow{((k-1),j)} D \bmod n.$$

Shares of $D_k$ are maintained in secret being held individually by each participant.

B. Generate Mask Shares $\alpha_i$

Each participant generates a random value $\alpha_i$, uniformly distributed in $Z^*_n$ with a polynomial of degree (k−1), using Algorithm 1 to create shares $$(\alpha_1, \ldots, \alpha_j) \xleftrightarrow{((k-1),j)} \alpha \bmod n.$$

These are used to multiplicatively mask $D_{k(i)}$.

The shares of $\alpha_i$ are secret and are maintained by the corresponding participant.

C. Generate Mask Shares $\beta_i$, $c_i$

Execute Algorithm 2 twice using polynomials of degrees 2(k−1).

Denote the shares created in these protocols as $$(\beta_1, \ldots, \beta_j) \xleftrightarrow{(2(k-1),j)} \beta \bmod n \text{ and}$$

$$(c_1, \ldots, c_j) \xleftrightarrow{(2(k-1),j)} c \bmod n.$$

These are used as additive masks. The polynomial must be of degree 2(k−1) because the numbers being masked involve the products of two polynomials of degree (k−1). This doubles the required number of shares needed to recover the secret.

The shares of $\beta$ and c are to be kept secret by the participants.

D. Compute Digest of Message m: e=H(m)

This value is checked against the received hash of the transaction obtained from $p_{(c)}$.

E. Broadcast $\upsilon_i = D_{k(i)} \alpha_i + \beta_i \bmod n$ and $\omega_i = G \times \alpha_i$ Participant $P_i$ broadcasts $\upsilon_i = D_{k(i)} \alpha_i + \beta_i \bmod n$ and $\omega_i = G \times \alpha_i$.

If no response is received from $P_i$, the value used is set to null.

It should be noted that:

$$(\upsilon_1, \ldots, \upsilon_j) \xleftrightarrow{(2(k-1),j)} D_k \alpha \bmod n$$

F Compute $\mu$=Interpolate ($\upsilon_i, \ldots, \upsilon_j$) mod n

Interpolate ( ) [2]:

Where $\{\upsilon_1, \ldots, \upsilon_n\}(j \geq (2k-1))$ forms a set, such that at most of (k−1) are null and all the residual values reside on a (k−1)-degree polynomial F(·), then $\mu = F(0)$.

The polynomial can be computed using ordinary polynomial interpolation. The function "Interpolate( )" is the Berlekamp-Welch Interpolation [2] and is defined[2] as an error correcting algorithm for BCH and Reed-Solomon codes. and also at Whittaker, E. T. and Robinson, G. "Lagrange's Formula of Interpolation." § 17 in The Calculus of Observations: A Treatise on Numerical Mathematics, 4th ed. New York: Dover, pp. 28-30, 1967.

G. Compute $\theta$=Exp-Interpolate ($\omega_1, \ldots, \omega_j$)

Exp-Interpolate( )[10]:

If $\{\omega_1, \ldots, \omega_j\}(j \geq (2k-1))$ is a set where at most (k−1) values are null and the remaining values are of the form $G \times \alpha_i$, and each $\alpha_i$ exists on some (k−1)-degree polynomial H(·), then $\theta = G \times H(0)$.

This value can be computed by $\theta = \Sigma_{i \in V} \omega_i \times \lambda_i = \Sigma_{i \in V} (G \times H(i)) \times \lambda_i \beta$ for which V is a (k)-subset of the correct $\omega_i$ values and further $\lambda_i$ represent the resultant Lagrange interpolation coefficients. The polynomial can be computed by using the Berlekamp-Welch decoder.

H. Compute $(R_x, R_y) = \theta \times \mu^{-1}$

I. Assign r=Rx mod q If r=0, go to step A.

Each participant $p_{(i)}$ computes their slice of $r_i$ in step J. The coordinator $p_{(c)}$ can use these values to reconstruct s if they have received a threshold number of responses.

J. Broadcast $s_i = D_{k(i)}(e + D_{A(i)}r) + c_i$ mod n

If a response is not solicited/received from $P_i$, the values used are set to null.

It should be noted that $$(s_1, \ldots, s_j) \xrightarrow{(2(k-1),j)}$$

$$D_k(m + D_A r) \bmod n(s_1, \ldots, s_n) \leftarrow \rightarrow k(m + D_A r) \bmod n.$$

K. Compute s=Interpolate $(s_1, \ldots, s_n)$ mod n

If s=0, go to step I.

Where the function Interpolate( ) is defined above.

Each participant $p_{(i)}$ computes their slice of $s_i$ in step J. The coordinator $p_{(c)}$ can use these values to reconstruct s if they have received a threshold number of $s_i$ responses.

L. Return (r,s)

M. Replace the signature section of the raw transaction and broadcast this to the network.

Dealer Distribution of Slices

The embodiments described above can be made much more flexible through the introduction of group shares. In this manner, the allocation of shares can be split between a dealer, multiple dealers, a group containing no dealers or any possible combination of the above in any level of hierarchical depth.

By replacing the value $d_A$ and its corresponding key slice $d_{A(i)}$ with a value derived using the same algorithm, hierarchies of votes can be created. For example, a scheme can be created that simultaneously integrates shares that are derived from:

1) Dealer based distributions
2) Multiple Dealers
3) No Dealer

Hence, the scheme is extensible and can be made to incorporate any business structure or organisational system.

The allocation of slices is also extensible. Deploying an uneven allocation process allows weighting on shares to be added. In the scheme displayed in FIG. 3, it is possible to create a hypothetical organisation with five top-level members. This, however, does not require setting the value of n=5 equally weighted shares. In this hypothetical organisation, it is possible to set the voting structure for the top-level schema as follows:

| | |
|---|---|
| Threshold(0) | 61 Shares |
| $D_{L02}$ | 15 Shares |
| $D_{L1}$ | 15 Shares |
| $D_{L2}$ | 15 Shares |
| $D_1$ | 45 Shares |
| $D_2$ | 10 Shares |

Here n=100 has been set. As noted this is an arbitrary value that can reflect any organisational structure. The organisation in FIG. 3 allows for a veto scenario ($D_1$) and through the introduction of multi-layered allocation allows for any voting structure that can be imagined.

Figure 3:
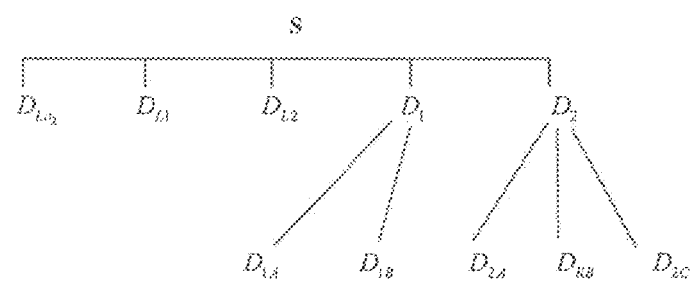
FIG. 3 illustrates a reconstructive hierarchy of shares distributed by means of an example method.

What is often missed in a multilevel hierarchical structure is that although slices of the secret have been allocated, these do not need to be evenly distributed and further, the ownership of subgroups does not need to mirror that of other levels. In FIG. 3 there is a seemingly powerful block controlling 45% of the total number of shares in 75% of the threshold. If the lower-level allocation of the shares is then considered, the scenario becomes far more complex. It is possible to create cross-ownership with individuals holding voting shares in multiple levels and positions on the table.

The distributions in Table 3 are defined as (Shares held, Threshold, Allocation {n}).

From the table above (3), it can be seen that participants P1 and P2 each hold sway over the votes but that the coalition with participant P4 provides either P1 or P2 with a sufficient voting block as long as P1 or P2 does not veto the vote.

As there are no limits to the implementation and structure of the voting format in the present invention, this can be used to create any organisational hierarchy that can be imagined as well as ensuring secure backup and recovery methodology.

TABLE 3

| Hypothetical organisation structure | | | |
|---|---|---|---|
| Participant | Level 0 | Level 1 | S. Votes (Max) | S. Votes (min) |
| P 1 | $D_{L02}$ (15, 61, 100) | $D_{1A}$ (5, 6, 10) $D_{2A}$ (3, 8, 10) | 70 | 15 |
| P 2 | $D_{L1}$ (15, 61, 100) | $D_{1B}$ (5, 6, 10) $D_{2B}$ (3, 8, 10) | 70 | 15 |
| P 3 | $D_{L2}$ (15, 61, 100) | | 15 | 0 |
| P 4 | | $D_{2C}$ (6, 8, 10) | 10 | 0 |

The result is that it is possible to have veto powers and voting rights that are assigned to higher level signing shares. In the present example ownership of the shares in S could be held at $D_{L0_2}$, $D_{1A}$ and $D_{2A}$.

Secure Multi-Party Computation

Secure multi-party function computation with n participants, $p_{(1)}, \ldots, p_{(i)}, \ldots, p_{(n)}$ is a problem based on the need to assess a function $F(x_1, \ldots, x_i, \ldots, x_n)$, involving $x_{(i)}$, a secret value provided by $p_{(i)}$ that is required to be maintained in confidence such that no participant $p_{(j \neq i)}$ or external party gains any knowledge of $x_{(1)}$. Hence, the objective is to preserve the confidentiality of each participant's values while being able to guarantee the exactness of the calculation.

In this scenario, the trusted third-party T collects all the values $x_{(i:1 \ldots n)}$ from the various participants $p_{(i:1 \ldots n)}$ and returns the calculation. This design works only in an idealised world where it is possible to implicitly trust T. Where there is any possibility that T could either be malicious, rogue or compromised, the use of a trusted third party becomes less viable. This scenario mirrors existing elections where the participants are the voters, and the trusted third party is played by government.

It has been proven [Bar-Ilan, 1989] that any value that can be computed in a secure manner using a trusted third-party may also be calculated without a trusted party while maintaining the security of the individual secrets $x_{(i)}$. The protocols presented herein are secure against private computation and provide secure computation even where a non-threshold group of compromise participants can collaborate.

Simple Multiplication

Where there are two secret values, x and y that are distributed among n participants $p_{(i:1\ldots n)}$, it is possible to compute the product xy while simultaneously maintaining the secrecy of both input variables x and y as well as ensuring that the individual secrets $x_{(i:1\ldots n)}$ and $y_{(i:1\ldots n)}$ are maintained by participant $p_{(i)}$ retaining the confidentiality.

In this scheme, x and y are each shared between a threshold group of participants using a polynomial of degree (k−1). Each participant $p_{(i)}$ can multiply their share of $x_{(i:1\ldots n)}$ on a polynomial of degree (k−1) of x and $y_{(i:1\ldots n)}$ in a polynomial of degree (k−1) on y.

Introducing Algorithm 2, returns the participant $p_{(i)}$ share of $z_{(i)}$, a polynomial of degree (2k−1). With this value, each participant $p_{(i)}$ calculates the value $x_{(i)}y_{(i)}+z_{(i)}$.

The return value for $x_{(i)}y_{(i)}+z_{(i)}$ represents a valid share of the calculation for x·y on a polynomial of degree (2k−1). Any participant or a coordinator acting for the threshold number of shares can use the return value held by each participant to calculate the true value of x·y without obtaining any knowledge of the individual shares.

Simple Addition

Where there are two secret values, x and y that are distributed among n participants $p_{(i:1\ldots n)}$, it is possible to compute the sum x+y while simultaneously maintaining the secrecy of both input variables x and y as well as ensuring that the individual secrets $x_{(i:1\ldots n)}$ and $y_{(i:1\ldots n)}$ that are maintained by participant $p_{(i)}$ retain the confidentiality.

As per the process for simple multiplication, each participant $p_{(i)}$ calculates the value $x_{(i)}+y_{(i)}+z_{(i)}$. The calculation of $z_{(i)}$ is not necessary, but adds a further level of randomness and confidentiality to the process.

The return value for $x_{(i)}+y_{(i)}+z_{(i)}$ represents a valid share of the calculation for x+y on a polynomial of degree (2k−1). Any participant or a coordinator acting for the threshold number of shares can use the return value held by each participant to calculate the true value of x+y without obtaining any knowledge of the individual shares.

If the participants are less hostile, this can be simplified as an $x_{(i)}+y_{(i)}$ addition without the additional step.

Inverse or Reciprocal

For a distributed secret value, x mod n which is distributed confidentially between j participants as $x_{(i:1\ldots j)}$, it is possible to generate shares of the polynomial associated with the value for $x^{-1}$ mod n while not revealing any information that could disclose the values $x_{(i)}$, x or $x^{-1}$ [Gennaro, 1996]. Again, each participant $p_{(i)}$ maintains a share of the value x represented by $x_{(i)}$ over a polynomial of degree (k−1).

Using Algorithm 1, each participant creates a share $x_{(i)}$ of an unknown secret x·y on a polynomial of degree (k−1). Each participant then runs Algorithm 2 to calculate (k−1) of a zero secret on a polynomial of degree (2k−1). Each participant (2k−1) performs the calculation to compute the value $x_{(i)}y_{(i)}+z_{(i)}$.

Using the Interpolate( ) routine presented above, each participant can calculate the value of $\mu=x_{(i)}y_{(i)}+z_{(i)}$ returning the value µ from the collected values of $\mu_i$. Each participant can then calculate the value of $\mu^{-1}$ mod n.

These values are sufficient such that any participant $p_{(i)}$ can compute the associated share of $x_i^{-1}$ using $\zeta_i = \gamma_i \mu^{-1}$ on a polynomial of degree (2k−1). The Berlekamp-Welch decoding scheme [Berlekamp, 1968] provides one of several methods that can be used to complete this process.

FIG. 9 shows, in flow chart form, one example method of carrying out secure multi-party computation of the quantity $\zeta = x^{-1}+w$, where the secure multi-party computation is carried out by a plurality of first nodes, and the computed secret is recovered by a second node. Initially, in step 901, shares $x_i, y_i, z_{1i}$ of secrets x, y, $z_1$ are distributed among the first nodes by the second node, where x, y, $z_1$ are the free term of respective polynomial functions, and $z_1$ is zero.

In step 902, each first node computes a respective share of $\mu_i = x_i y_i + z_i$. By means of polynomial interpolation, the product µ=xy is determined by a node (which may be one or more of the first nodes or the second node) having received a threshold number of shares $\mu_i$ in step 903. In step 904, the reciprocal $\mu^{-1}$ mod n=$x^{-1} \cdot y^{-1}$ mod n is then determined in step 904. In step 905, shares $w_i, z_{2i}$ of secrets w, $z_2$ are then distributed among the first nodes by the second node, where w and $z_2$ are respective free terms of polynomial functions, $z_2$ being zero. In step 906, each first node determines its share $\zeta_i$ of the common secret, where $\zeta_i = y_i \mu^{-1} + w_i + z_{2i} = y_i \cdot x^{-1} \cdot y^{-1} + w_i + z_{2i}$. The second node then receives a threshold number of shares $\zeta_i$ in step 907 from the first node, and then carries out polynomial interpolation in step 908 to determine the computed secret $\zeta_i = x^{-1}+w$ mod n, without the individual secrets x, y or w being made available to any of the first nodes.

Assignment

The ability to sign a transaction in a verifiable and provable manner provides the opportunity to prove ownership privately and even relinquish or exchange ownership of the Bitcoin private key and associated bitcoin address without publicly moving anything on the Blockchain. In this manner, a Bitcoin address can be funded, and the contents of that address may be transferred or sold without leaving a public record. As this process is a threshold system, the assignment of key slices can be achieved securely without further settlement recorded on the Blockchain.

In this way, it is possible to separate the ownership of a note already settled on the Blockchain from the process of transacting that note.

CLTV

A Bitcoin message or in more common parlance, transaction, can be created with the inclusion of a CLTV [BIP 65] entry. With this addition, the transaction can be made recoverable even in the event of catastrophic loss of all key slices or if multiple slices from an entity are deemed untrustworthy or lost in a manner that does not allow for the secure reconstruction of a signature with a minimum threshold.

This is further possible where an entity is using a third-party service and desires to ensure that that service cannot hold or deny access to the keys. In constructing a Bitcoin transaction with a time based fail safe, the user knows that a malicious third-party or a compromised exchange site or bank cannot extort them for access to their keys. As a worst-case scenario, the compromise to a catastrophic level would lead to the time-based reversal of a transaction to a predefined address based on a CLTV condition. This predefined address can be created using the protocols disclosed within this application. As such, it is possible to construct a series of transactions and keys that cannot be readily compromised.

Security Considerations

Benger et. al. (2014) offered one example of ECDSA private key recovery using a Flash and reload methodology. This occurrence is but one example of attacks against system RAM and Cache. These methods leave the use of procedures such as that of Shamir's SSS [1979] wanting as they reconstruct the private key. Moreover, in any scenario in which a private key is reconstructed at any time, a requirement for trust is introduced. It is necessary in this scenario to rely on the systems and processes of the entity holding the private key.

Even if the trusted party is not malicious, there is a necessity to rely on their processes. As has been seen from many recent compromises, this reliance on reconstructing the private key leaves avenues of attack.

As both a drop-in replacement for the existing ECDSA implementations as well as being completely transparent and compatible with the current bitcoin protocol, no hard fork or soft fork is required for its implementation, and the implementation is indistinguishable from any current transaction. The present invention can treat individuals as separate participants allowing for the group signing of keys with a recovery function. As an example, a two of two scheme can be implemented using four key slices where the online wallet provider or exchange maintains two key slices and the end user maintains two slices. The exchange and the user would each have a two of two process over their key slices which would then be used in conjunction with each other for the secure signing of a message when required.

Threshold Vault

The above-described processes and techniques may be used to generate a public-private key pair in a manner that avoids any node having the capability of independently generating the private key. The private key shares individually held by each node are never exposed in communications and can be refreshed as needed to further enhance security or to address key share loss. This functionality facilitates implementation of a "Threshold Vault" within a blockchain network. A threshold vault is an address on the blockchain in association with which a digital asset may be recorded such that a threshold number of nodes holding private key shares are required to collaborate in order to access, transfer, or otherwise deal with the digital asset in the threshold vault. The threshold vault may be established such that all or a subset of the key shares are necessary to digitally sign a transaction having the threshold vault as an input. The threshold may be set depending on the purpose and objective of the vault. For example, in some instances in which the primary objective is protecting against disclosure of the private key, the threshold may be set to 100% of the key shares. In some instances, in which the primary objective is a voting scheme, 51% or more of the key shares may be set as the threshold. In one example, both security and protection against key share loss may be objectives, in which case a ⅗ (for example) threshold may be set with the primary vault owner controlling $3/5^{th}$ of the key shares and with one or more third-party repositories holding the remaining $2/5^{th}$ of the key shares, thereby allowing the primary vault owner to collaborate with the third-party repositories to have them use their key shares in circumstances when the primary vault owner loses access to one or more (but not all) of their key shares. In this manner the third-party repositories may serve as guardians of "back-up" key shares in the event of loss of one of the primary vault owner's key shares.

Figure 4:
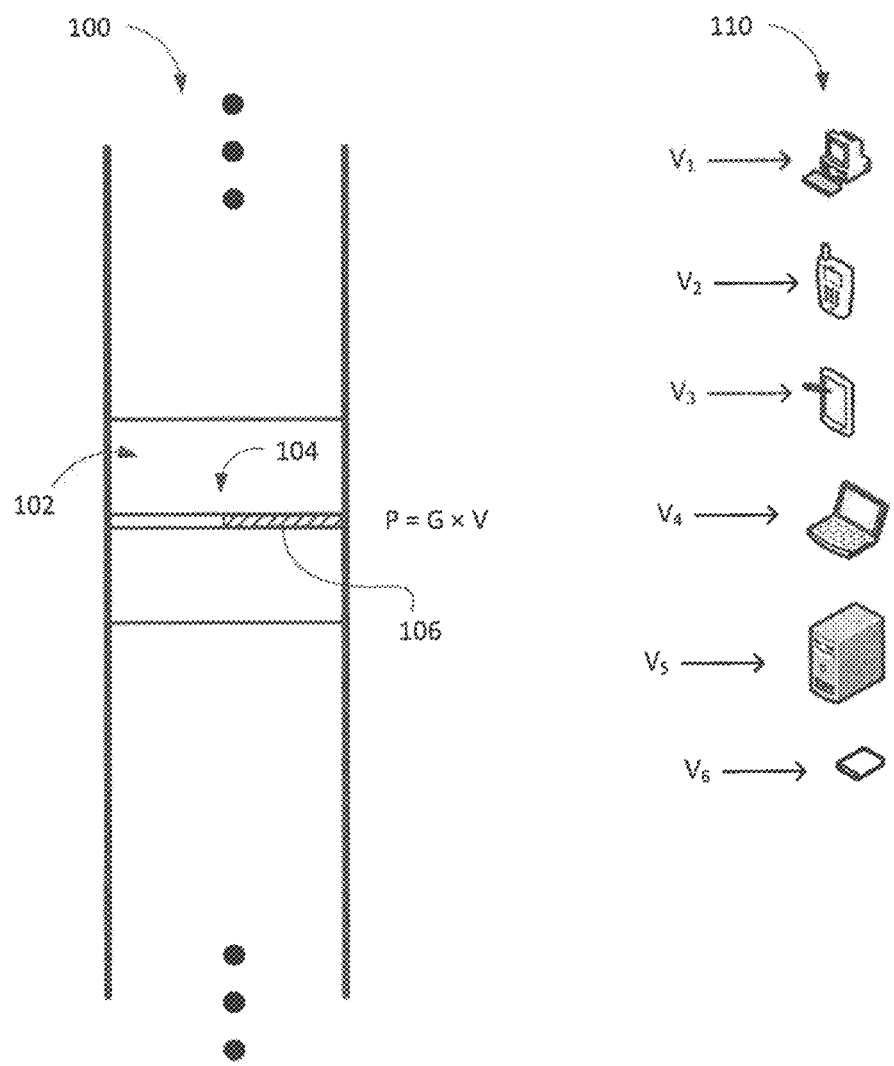
FIG. 4 diagrammatically shows an example distribution of shares relating to an implementation of a threshold vault.

To illustrate by way of one example, reference is now made to FIG. 4, which diagrammatically shows an example distribution of shares relating to an implementation of a threshold vault. In this example, a partial blockchain 100 is illustrated, including a block 102. The block 102 is partially made up of transactions, including a transaction 104 that features an output 106 associated with a vault address P. The vault address P is publicly available. The unspent transaction output (UXTO) associated with the vault address is then available to serve as an input to another transaction.

For the UXTO to be used as an input to another transaction, the private key V corresponding to the vault address must be used in generating a digital signature. In this case, the private key V has not been generated and will not be generated. Instead, the private key is held in the form of private key shares $(V_1, V_2, \ldots, V_n)$ across multiple nodes 110. Those key shares may by stored in full blockchain nodes (e.g. servers, personal computers, or the like), wallet nodes (e.g. implemented within a personal computer, tablet, laptop, mobile device, or any other networked computing device capable of running blockchain wallet software), offline memory/storage (e.g. a USB stick, memory card, or other persistent digital storage medium), online repositories (e.g. a blockchain exchange account, banking network device, or other remote third-party operated service for storing blockchain data), or any other such computing device.

In some example implementations, each node may be operated by or controlled by a separate entity, such that collaboration among a threshold number of owners is needed to generate a digital signature relating to the vault address P. In some example implementations, a threshold number of nodes may be controlled by a single entity, although the key shares are physically and logically in separate electronic devices for key security purposes. Additional key shares, but not a threshold number, are stored in electronic devices operated by other entities that may serve to act as key recovery services in the case of loss of a key share by the principal owner. In yet other example implementations, two (or more) entities may control respective key shares sufficient to collaborate on digital signature generation, such as in the case of two (or more) partners, or a principal and a co-signing authority (e.g. a bank, a parent company, etc.). Those ordinarily skilled in the art will appreciate the range and variety of logic and legal relationships that may be reflected in the distribution of key shares among parties and the setting of related thresholds for signing.

Figure 5:
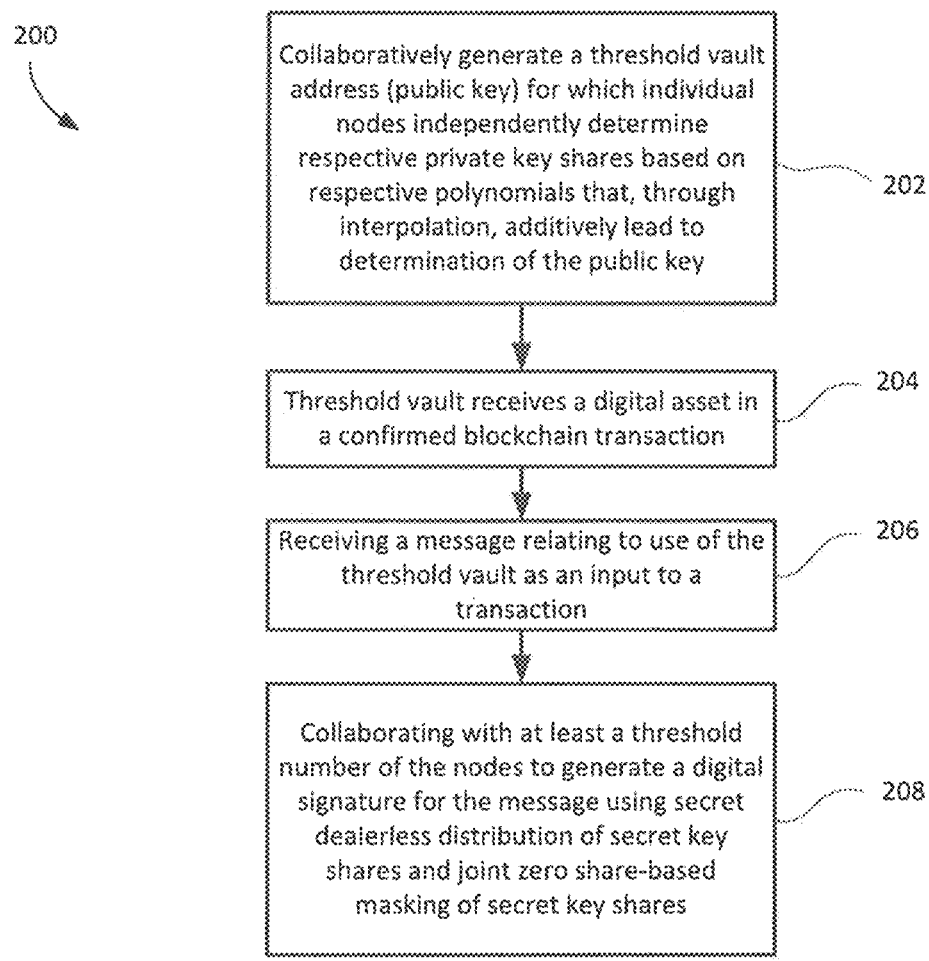
FIG. 5 shows, in flowchart form, one example method of receiving and distributing a digital asset using a threshold vault.

Reference will now be made to FIG. 5, which shows, in flowchart form, one example method 200 of receiving and transferring a digital asset using a threshold vault. In this example, a plurality of nodes is to collaborate in generating a threshold vault address, and in secretly and securely generating and distributing the corresponding key shares without any central dealer or authority, thereby ensuring that no node has access to the key share of any other node during the generation process or during the digital signing process.

In operation 202, the nodes collaboratively generate a threshold vault address (e.g. a public key) for which the individual nodes independently generate and store a respective private key share based on respective polynomials secretly selected by each individual node. The polynomial selected by each node is of an order based on the threshold agreed upon between the nodes. For example, among j nodes, in initiating the threshold vault generation process the nodes may have agreed to set a threshold of k collaborating nodes being required to use the private key (the term "use"

signifies that, in the present application, the private key is never actually reconstructed by any node), where k≤j. The threshold vault address can be determined by any or each of the nodes based on certain polynomial values shared by the nodes and using polynomial interpolation.

In operation 204, a transaction is added to a block on the blockchain (and is validated and confirmed) that transfers a digital asset to the threshold vault address.

As some future point, in operation 206, a transaction is generated (may be termed a "message" more generically) that proposes to use the digital asset as an input to that transaction. This proposed transaction may be generated by one of the nodes or by another unrelated node. Having received the message that features the threshold vault address as an input, the nodes determined whether to approve the transaction by digitally signing it.

Assuming the nodes are instructed to approve the transaction, in operation 208, at least a threshold k number of the nodes collaborate to generate a digital signature for the message. This collaboration relies upon the use of joint zero secret sharing to generate randomized mask shares among the nodes that are used in the process to mask any key shares used, thereby ensuring that no node received any other node's key shares. Any mask shares or key shares used in the digital signature process are generated and distributed using secret dealerless distribution. The digital signature process includes the determination of a first signature component r and a second signature component s. In the determination process, any ephemeral key shares or private key shares are masked before being shared, and any sharing is of a value with the masked key share embedded within another expression, as detailed above and as further explained below.

Accordingly, the digital signature for the message is generated without ever generating the full private key and without revealing any private key share held by any of the nodes.

Figure 6:
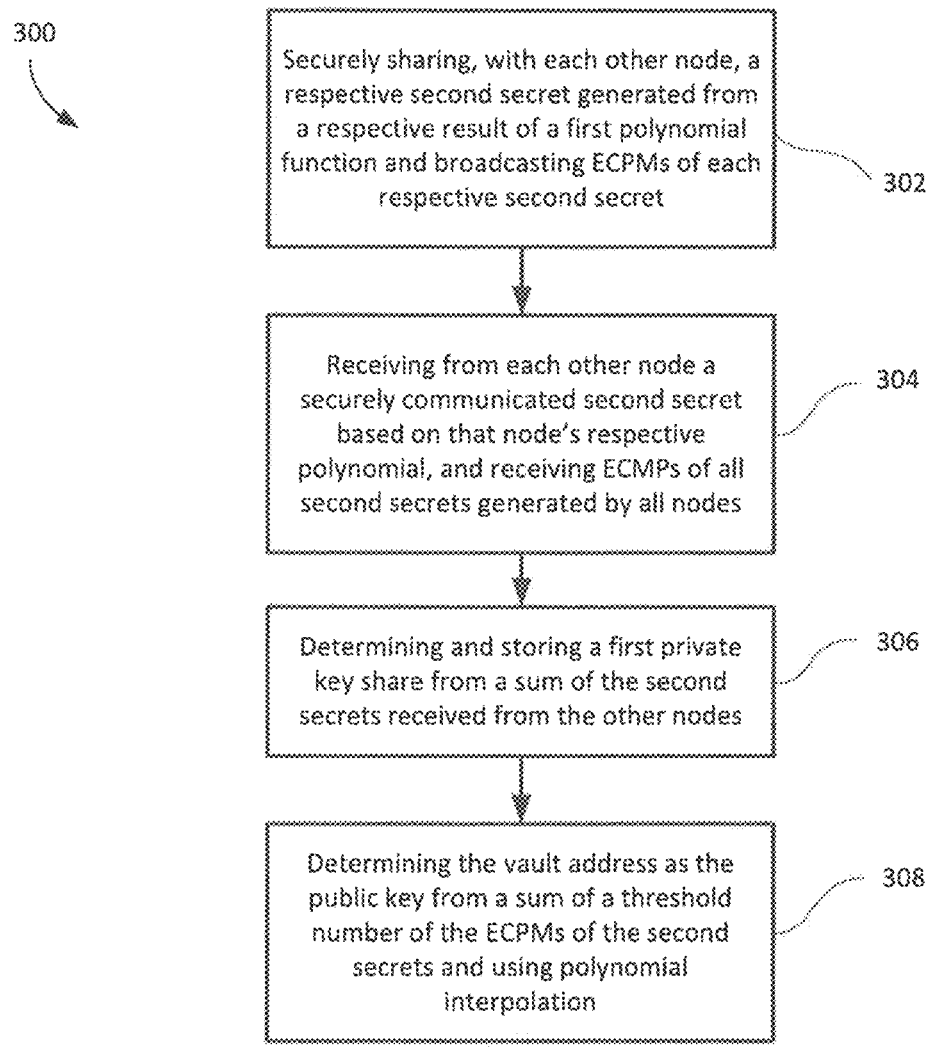
FIG. 6 shows, in flowchart form, an example method of generating a threshold vault.

Reference is now made to FIG. 6, which shows, in flowchart form, one example method 300 for generating a threshold vault address. The threshold k is set in advance. Each of the nodes establishes secure communication with each of the other nodes. This may include determining a common secret for secure exchange of information, as described in [Wright 2016], although any other encryption key generation process may be employed provided that each node can send encrypted communications to, and receive and decrypt encrypted communications from, each other node.

The method 300 begins with each of the nodes $p_i$ (i=0 to j) having its own respective first secret, $a_0^{(i)}$. The first secret may be obtained or determined in any suitable manner.

Each node also selects its own respective polynomial $f_i(x)$ of degree k−1 with the free term, e.g. $f_i(0)$, of the polynomial being the node's first secret, i.e. coefficient $a_0$. The respective polynomials may each have different coefficients $a_t$, but each is of the form:

$$f_i = \sum_{t=0}^{(k-1)} a_t x^t \bmod n$$

Each of the nodes determines a value of its polynomial for each of the other nodes. In this context, x may be set to an index h associated with the other nodes h=1, . . . , (i−1), (i+1), . . . , j. In other words, each node determines the value of $f_i(h)$, for all h (h≠i). These values may be termed respective "second secrets". The operations of the method 300 are described below in connection with a "first node" i, although the same or similar operations are carried out by each of the other nodes.

As indicated by operation 302, the first node i securely shares (i.e. over an encrypted channel) the second secret, $f_i(h)$ for node h with that node h. That is, to each other node h a first node i sends the value $f_i(h)$. The first node i then also broadcasts to all the other nodes an elliptic curve point multiplication (ECPM) of all the second secrets it has determined. That is, it sends every other node h the values for $f_i(h) \times G$ for all h. It also broadcasts (i.e. sends to each of the other nodes) the ECPM of its polynomial coefficients $a_K^{(i)} \times G$ for K=0, . . . , (k−1). Accordingly, the first node has not revealed its polynomial coefficients, but rather a 'public key' corresponding to each coefficient, and has not revealed the determined second secrets generally, but rather a 'public key' corresponding to each determined second secret. It has only confidentially shared one second secret with each other node.

The first node i receives, in operation 304, from each node of the other nodes (or at least k−1 of them) a 'second secret' determined by that other node for the index i. That is, the first node receives the value $f_h(i)$ for each h≠i (or at least k−1 of the j−1 nodes). The first node also receives the ECPM values broadcast by the other nodes, i.e. the ECPM of the second secrets and the ECPM of the coefficients of each respective polynomial.

Although not explicitly illustrated in FIG. 6, the nodes may independently verify and validate the second secrets received from the other nodes based on the broadcast values. That is, each node may determine that the second secret obtained from node his valid by calculating its ECPM value and comparing it with the broadcast ECPM values from that other node.

In operation 306, the first node i determines and stores a first private key share $d_{A(i)}$ as the sum of the respective second secrets $f_h(i)$ received from each of the other (at least k−1) nodes. The sum of those respective second secrets determined by node i may be expressed as:

$$d_{A(i)} = \sum_{h=1}^{j} f_h(i) \bmod n$$

In operation 308, one or more of the nodes (may be delegated to a node other than the first node or may be done by more than one or all of the nodes) determines the threshold vault address, i.e. the public key $Q_A$ corresponding to the private key $d_A$ for which the nodes each have a private key share $d_{A(i)}$. The public key is obtained from a sum of a threshold number of ECPM's of the second secrets and using polynomial interpolation. As described above, this may be expressed as:

$$Q_A = \text{Exp-Interpolate}(f_1, \ldots, f_j) \triangleright [=G \times d_A]$$

It will be appreciate that the method 300 results in independently generated private key shares $d_{A(i)}$ at the nodes corresponding to a threshold vault address given by public key $Q_A$.

Figure 7:
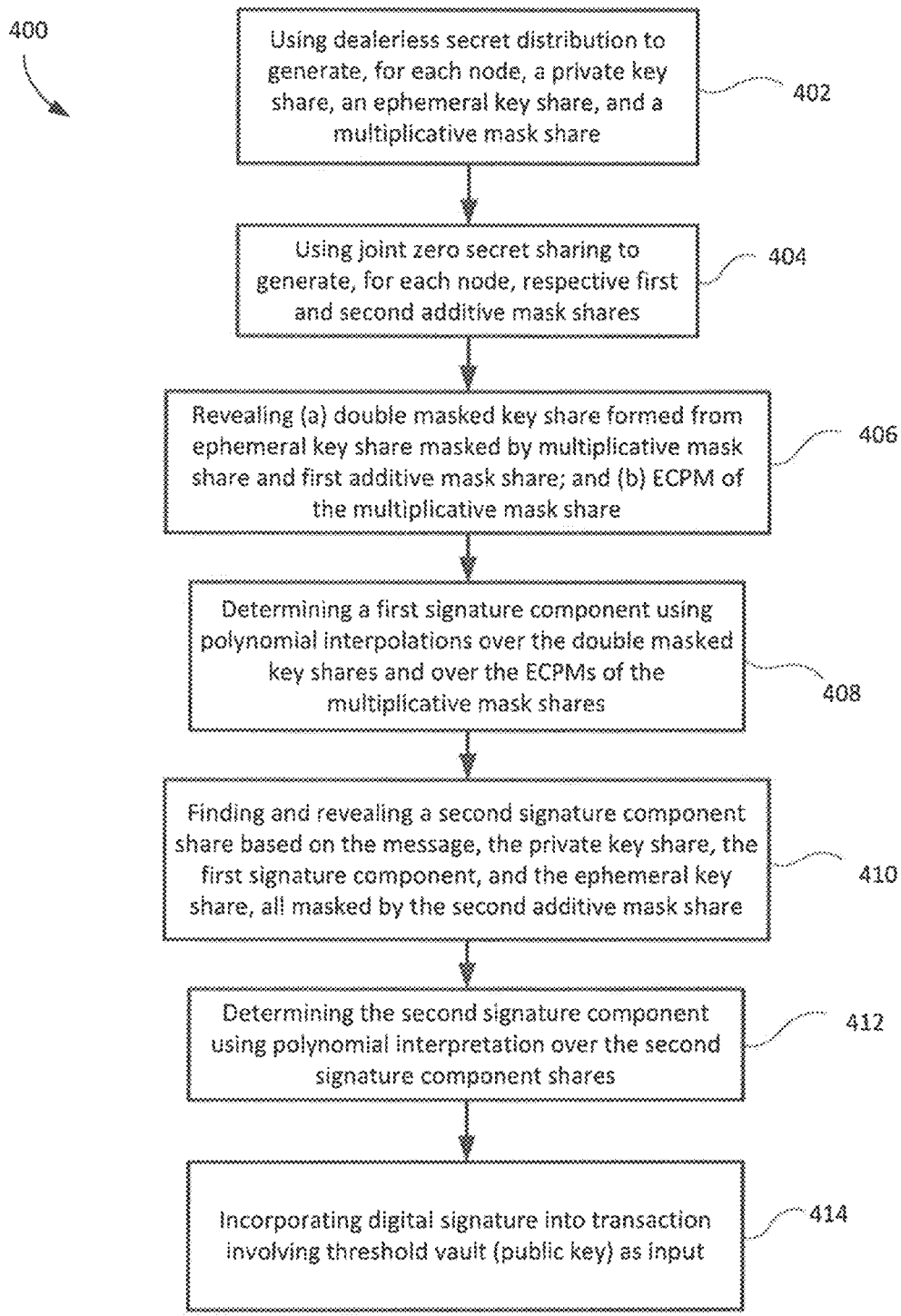
FIG. 7 shows, in flowchart form, an example method of generating a digital signature for distributing an asset from a threshold vault.

Reference will now be made to FIG. 7, which shows, in flowchart form, one example method 400 of digitally signing a message relating to a threshold vault. The method 400 is used to generate a digital signature for a message m, which may be represented by message hash e=H(m). The message m may be presumed to relate to a proposed blockchain transaction to which the threshold vault is an input. Accordingly for the transaction to be validated, it will require a digital signature confirming possession of the private key corresponding to threshold vault public key $Q_A$. Of course, none of the nodes has the private key or has the ability to generate the private key; they only hold private key shares $d_{A(i)}$. Nevertheless, the method 400 provides a mechanism for a threshold number of nodes to collaborate in generating a valid digital signature without ever revealing their private key shares.

As indicated by operation 402, the method 400 includes using dealerless secret distribution to generate, for each node i, an ephemeral key share $D_{k(i)}$, and a multiplicative mask share $\alpha_i$. The node i already holds a private key share $d_{A(i)}$ that was generated using method 300, for example. In operation 404, joint zero secret sharing (JZSS) is used (such as is described above in connection with Algorithm 2) to generate a first and a second additive mask share, $\beta_i$ and $c_i$. The first additive mask share and the second additive mask share are not related.

Each node then, in operation 406, reveals a double masked key share formed based on the ephemeral key share masked by the multiplicative mask share and the first additive mask share. In one example, the double masked key share is expressed as:

$$\vartheta = D_{k(i)}\alpha_i + \beta_i \bmod n$$

Each node also reveals a public multiplicative mask share corresponding to an ECPM of the multiplicative mask share, which may be expressed as:

$$\omega_i = G \times \alpha_i$$

None of the nodes ever reveals its private key share, ephemeral key share, or mask shares.

In operation 408, a first signature component r is determined from the revealed data. The determination may be made by each of the nodes independently or by one of the nodes and shared and/or verified by the other nodes.

An elliptic curve digital signature algorithm (ECDSA) involves determining an inverse of a random value k, which in this example is the ephemeral key $D_k$, i.e. it involves $D_k^{-1}$. In order to determine the first signature component r, a masked ephemeral key $\mu$ may be determined using polynomial interpolation over the double masked key shares:

$$\mu = \text{Interpolate}(\vartheta_1, \ldots, \vartheta_n) \bmod n$$

Because the additive mask is based on a joint zero share, it drops out of the interpolation, leaving the result $\mu = D_k \alpha \bmod n$. Likewise, exponential polynomial interpolation over the ECPM of the multiplicative mask shares gives:

$$\theta = \text{Exp-Interpolate}(\omega_1, \ldots, \omega_n)$$

$$\theta = G \times \alpha$$

The first signature component r is then obtained by calculating $r_{x,y} = (R_x, R_y) = \theta \times \mu^{-1}$, which is:

$$r_{x,y} = (G \times \alpha) \times [D_k \alpha \bmod n]^{-1} = G \times D_k^{-1}$$

The first signature component r is Rx mod n.

In operation 410, each node (or at least k of them) determines a second signature component share $s_i$. The second signature component involves the ephemeral key, the private key, the hash of the message, and the first signature component. No node holds the ephemeral key or the private key; they have only key shares. Accordingly, each node generates a second signature component share $s_i$ as:

$$s_i = D_{k(i)}(e + d_{A(i)}r) + c_i \bmod n$$

This value is then broadcast or shared with the other nodes. Note that the second additive mask share is used to improve security in revealing the second signature component share.

In operation 412, the second ECDSA signature component, s, is then obtained from the second signature component shares through polynomial interpolation:

$$s = \text{Interpolate}(s_1, \ldots, s_j) \bmod n$$

Here again, the second additive mask share $c_i$ drops out of the interpolation since it originates from a join zero share. Nevertheless, it serves to provide a random mask to the revealed second signature component shares. Operation 412 may be carried out by one or more of the nodes or by a delegated node. Having generated the two components (r, s), a digital signature of the message m is thus generated without revealing any of the private key shares or any of the ephemeral key shares.

In operation 414, the digital signature is incorporated into a blockchain transaction containing the message that has now been digitally signed. That transaction may then be submitted to the network for validation and eventual confirmation.

Figure 8:
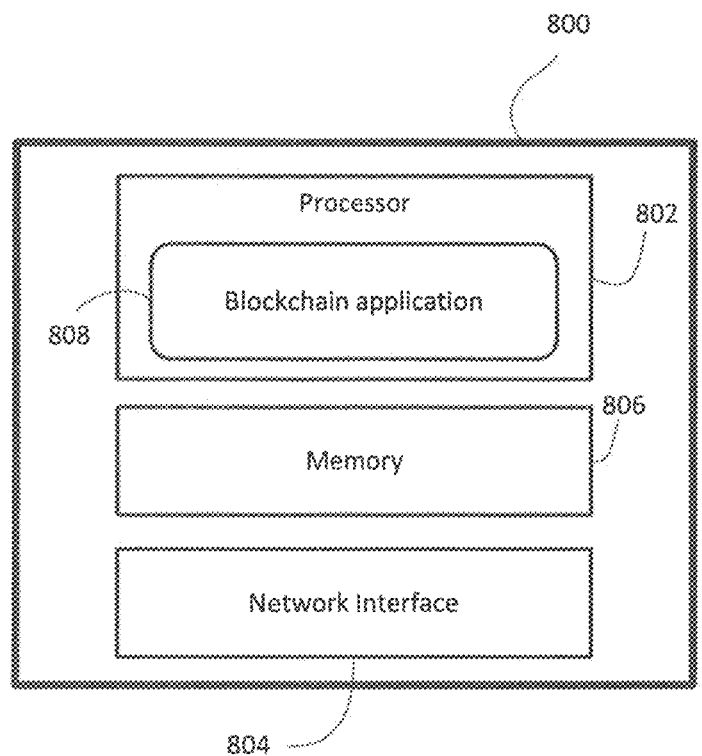
FIG. 8 shows an example block diagram of a blockchain node.

Reference will now be made to FIG. 8, which shows, in block diagram form, a simplified example of a node 800. The node 800 includes a processor 802, which may include one or more microprocessors, application specific integrated chips (ASICs), microcontrollers, or similar computer processing devices. The node 800 further includes memory 804, which may include persistent and non-persistent memory, to store values, variables, and in some instances processor-executable program instructions, and a network interface 806 to provide network connectivity over wired or wireless networks.

The node 800 includes a processor-executable blockchain application 808 containing processor-executable instructions that, when executed, cause the processor 802 to carry out one or more of the functions or operations described herein.

It will be understood that the devices and processes described herein and any module, routine, process, thread, application, or other software component implementing the described method/process for configuring the node may be realized using standard computer programming techniques and languages. The present application is not limited to particular processors, computer languages, computer programming conventions, data structures, or other such implementation details.

CONCLUDING REMARKS

The present invention forms the foundation of what Bitcoin sought to achieve with the introduction of a group signature process. The addition of a fault tolerable signing system with the coupling of a distributed key creation system removes all centralisation and trust requirements.

Moreover, the introduction of an implicitly decentralised system allows for the creation of more robust and resilient protocols. The compatibility between ECDSA [Johnson, 2001] and Shamir's SSS [Shamir, 1979] has allowed the present invention to introduce a system that extends Bitcoin with a new verifiable secret sharing scheme. This system is far more efficient than anything derived by Feldman [Feldman, 1987] or Pedersen [Pedersen, 1992] while losing nothing in security.

In the present application, a system has been described that extends the functionality of Bitcoin without the requirement for a change in the base protocol. Using the present invention:

1. a trusted third-party is no longer required for the selection or distribution of a key secret,
2. a distributed banking exchange system can be created that does not rely on third-party trust,
3. each member or group of members may independently verify that the share of the secret key that is held corresponds to the Bitcoin address and public key advertised,
4. a protocol exists to refresh the private key slices to mitigate the effects of eavesdropping and related attacks, and
5. no trusted third-party is required for the group signing of transactions and messages.

As the present invention prevents sensitive data from ever appearing in memory, it completely solves many extant security risks.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

1) Bar-Ilan, J. Beaver, "Non-Cryptographic Fault-Tolerant Computing in a Constant Number of Rounds", Proc. of 8th PODC, pp. 201-209, 1989.
2) Berlekamp, Elwyn R. (1968), Algebraic Coding Theory, McGraw-Hill, New York, N.Y.
3) Benger, N., van de Pol, J., Smart, N. P., Yarom, Y.: "Ooh Aah . . . Just a Little Bit": A Small Amount of Side Channel Can Go a Long Way. In: Batina, L., Robshaw, M. (eds.) Cryptographic Hardware and Embedded Systems | CHES 2014, LNCS, vol. 8731, pp. 75-92. Springer (2014)
4) Ben-Or, M., Goldwasser, S., Wigderson, A.: "Completeness theorems for noncryptographic fault-tolerant distributed computation". In: Proceedings of the Twentieth Annual ACM Symposium on Theory of Computing. pp. 1-10. STOC '88, ACM, New York, N.Y., USA (1988)
5) BIP 65 OP_CHECKLOCKTIMEVERIFY
6) Chaum, David (1983). "Blind signatures for untraceable payments" (PDF). Advances in Cryptology Proceedings of Crypto. 82 (3): 199-203.
7) Dawson, E.; Donovan, D. (1994), "The breadth of Shamir's secret-sharing scheme", Computers & Security, 13: Pp. 69-78
8) Desmedt. Yuo (1987). "Society and Group Oriented Cryptography: A New Concept". In A Conference on the Theory and Applications of Cryptographic Techniques on Advances in Cryptology (CRYPTO '87), Carl Pomerance (Ed.). Springer-Verlag, London, UK, UK, 120-127.
9) Feldman. P. "A practical scheme for non-interactive verifiable secret sharing". In Proceedings of the 28th IEEE Annual Symposium on Foundations of Computer Science, pages 427-437, 1987.
10) Gennaro, R., Jarecki, S., Krawczyk, H., Rabin, T.: "Robust threshold DSS signatures". In: Proceedings of the 15th Annual International Conference on Theory and Application of Cryptographic Techniques. pp. 354-371. EUROCRYPT '96, SpringerVerlag, Berlin, Heidelberg (1996)
11) Ibrahim, M., Ali, I., Ibrahim, I., El-sawi, A.: "A robust threshold elliptic curve digital signature providing a new verifiable secret sharing scheme". In: Circuits and Systems, 2003 IEEE 46th Midwest Symposium on. vol. 1, pp. 276-280 (2003)
12) Johnson, D., Menezes, A., Vanstone, S.: "The elliptic curve digital signature algorithm (ecdsa)". International Journal of Information Security 1(1), 36-63 (2001)
13) Kapoor, Vivek, Vivek Sonny Abraham, and Ramesh Singh. "Elliptic Curve Cryptography." Ubiquity 2008, no. May (2008): 1-8.
14) Knuth, D. E. (1997), "The Art of Computer Programming, II: Seminumerical Algorithms" (3rd ed.), Addison-Wesley, p. 505.
15) Koblitz, N. "An Elliptic Curve Implementation of the Finite Field Digital Signature Algorithm" in Advances in Cryptology—Crypto '98. Lecture Notes in Computer Science, vol. 1462, pp. 327-337, 1998, Springer-Verlag.
16) Liu, C. L. (1968), "Introduction to Combinatorial Mathematics", New York: McGraw-Hill.
17) National Institute of Standards and Technology: FIPS PUB 186-4: "Digital Signature Standard" (DSS) (2003)
18) Pedersen, T.: "Non-interactive and information-theoretic secure verifiable secret sharing". In: Feigenbaum, J. (ed.) Advances in Cryptology—CRYPTO '91, LNCS, vol. 576, pp. 129-140. Springer (1992)
19) Rabin T. & Ben-Or. M. (1989) "Verifiable secret sharing and multiparty protocols with honest majority". In Proc. 21st ACM Symposium on Theory of Computing, pages 73-85, 1989.
20) Shamir, Adi (1979), "How to share a secret", Communications of the ACM, 22 (11): Pp. 612-613
21) Wright, C. & Savanah, S. (2016) "Determining a common secret for two Blockchain nodes for the secure exchange of information" International Patent Application Number Application Number: WO 2017/145016.

The invention claimed is:

1. A computer-implemented method of securely generating a threshold vault, where the threshold vault has a public key address, a private key and a threshold k, each node of a plurality of nodes having a respective first secret and a respective k−1 degree polynomial function with that node's respective first secret set as a constant term of said polynomial function, the nodes including a first node having a first polynomial function, the method performed by the first node comprising:

for each other node of the plurality of nodes, setting a variable in the first polynomial function to a value associated with that other node, finding a respective result of the polynomial function for that value, and securely communicating the respective result to that other node;

receiving, from at least a threshold number of the other nodes, respective second secrets, where each of the respective second secrets is a result of that other node's respective polynomial function for a first value associated with said first node;

communicating, to the other nodes, an elliptic curve point multiplication of each of the respective results;

receiving, from at least the threshold number of the other nodes, elliptic curve point multiplications of the respective second secrets shared by the other nodes with any of the nodes;

forming and storing a first private key share of the private key based on a sum of the respective second secrets received from the other nodes; and determining the public key corresponding to the private key based on a sum of the received elliptic curve point multiplications of the respective second secrets and using polynomial interpolation.

2. The method of claim 1 wherein each respective polynomial function is selected independently by the respective node corresponding to said polynomial function, and wherein each respective polynomial function has a different set of coefficients.

3. The method of claim 1, wherein each respective polynomial function is of the form:

$$f_i = \Sigma_{t=0}^{(k-1)} a_t x^t \bmod n$$

where $f_i$ is the polynomial function of an ith node, n is an integer order of an elliptic curve, x is the variable in the polynomial function, $a_t$ is a set of coefficients for the polynomial function, and t is an index.

4. The method of claim 1, further comprising communicating to the other nodes an elliptic curve point multiplication of each coefficient of the first polynomial function.

5. The method of claim 1, further comprising receiving, from at least the threshold number of the other nodes, an elliptic curve point multiplication of each coefficient of the respective polynomial functions corresponding to said nodes.

6. The method of claim 1, further comprising validating the respective second secrets received from the other nodes.

7. The method of claim 1, wherein forming the first private key share includes determining a sum of form:

$$d_{A(i)} = \sum_{h=1}^{j} f_h(i) \bmod n$$

where $d_{A(i)}$ is the first private key share, h is an index of the other nodes, $f_h(\ )$ is the respective polynomial function of an $h^{th}$ node, n is an integer order of an elliptic curve, and i is the first value associated with said first node, and wherein each non-null $f_h(i)=1, \ldots$ j is one of the respective second secrets.

8. The method claimed in claim 1, further comprising modifying the first private key share through collaboratively participating with the other nodes in a dealerless secret distribution of a joint zero secret share whereby the first node receives a first zero secret share and modifies the first private key share by adding the first zero secret share to form and store a modified first private key share.

9. The method of claim 1, wherein the step of determining the public key comprises determining said polynomial function, by means of determining coefficients of the polynomial function from a plurality of known values of the received elliptic curve point multiplications of the respective second secrets.

10. A method according to claim 9, wherein the step of determining said polynomial function comprises executing an error correction algorithm.

11. A method according to claim 9, wherein the step of determining said polynomial function comprises executing a Berlekamp-Welch decoding algorithm.

12. A method according to claim 9, wherein the step of determining said polynomial function comprises:

defining an error locator polynomial function and a second polynomial function, wherein the second polynomial function is a product of said polynomial function and said error locator polynomial function, determining coefficients of said second polynomial function and said error locator polynomial function from a plurality of known values of the received elliptic curve point multiplications of the respective second secrets, and determining said polynomial function from said second polynomial function and an error detector polynomial function.

13. A computer-implemented method of securely generating a digital signature for a message relating to a threshold vault, where the threshold vault has a public key address, a private key and a threshold, each node of a plurality of nodes having a respective private key share, ephemeral key share, multiplicative mask share, first additive mask share, and second additive mask share, the method performed by a first node of the plurality of nodes comprising:

generating and sharing a double masked key share from the ephemeral key share masked by the multiplicative key share and by the first additive key share, and an elliptic curve point multiplication of the multiplicative key share;

receiving from at least a threshold number of other nodes, the respective double masked key shares corresponding to said nodes and respective elliptic curve point multiplication (ECPM) of the multiplicative key shares corresponding to said nodes;

determining a first signature component using polynomial interpolation over the double masked key shares and polynomial interpolation over the ECPM of the multiplicative key shares; and determining and revealing a second signature component share based on the message, the private key share, the first signature component, the ephemeral key share, masked by the second additive mask share, whereby the second signature component is obtainable from the respective second signature component shares of at least the threshold number of the nodes.

14. The method of claim 13, further comprising using dealerless secret distribution to generate the first node's private key share, ephemeral key share, and multiplicative mask share.

15. The method of claim 13, further comprising using joint zero secret share to generate the first node's first additive mask share and second additive mask share.

16. The method of claim 13, wherein generating the double masked key share includes calculating:

$$\vartheta_i = D_{k(i)} \alpha_i + \beta_i \bmod n$$

where $\vartheta_i$ is the double masked key share, $D_{k(i)}$ is the first node's ephemeral key share, $\alpha_i$ is the first node's multiplicative mask share, $\beta_i$ is the first node's first additive mask share, and n is an integer order of an elliptic curve.

17. The method of claim 13, wherein the polynomial interpolation over the double masked key shares results in a multiplicatively-masked ephemeral key, the polynomial interpolation over the ECPM of the multiplicative mask shares results in an ECPM of a multiplicative mask, and wherein determining the first signature component includes determining a product of the ECPM of the multiplicative mask and an inverse of the multiplicatively-masked ephemeral key.

18. The method of claim 13, wherein determining the second signature component share, includes determining:

$$s_i = D_{k(i)}(e + d_{A(i)}r) + c_i \mod n$$

where $D_{k(i)}$ is the first node's ephemeral key share, e is a hash of the message, $d_{A(i)}$ is the first node's private key share, r is the first signature component, $c_i$ is the second additive mask share, and n is an integer order of an elliptic curve.

19. The method of claim 13, further comprising determining the second signature component through polynomial interpolation over the second signature component shares of at least the threshold number of the nodes.

20. The method of claim 19, further comprising adding the first signature component and the second signature component to a transaction containing the message and submitting the transaction to a blockchain network.

21. A computer implemented method of multi-party computation,
the method comprising:
distributing, among a plurality of first nodes, shares of a plurality of secrets, wherein each said secret is a constant term of a respective polynomial function, and each said share is a respective value of the polynomial function associated with said first node, wherein the secret is accessible by means of polynomial interpolation of a threshold number of said shares and is inaccessible in the absence of said threshold number of shares;
receiving, at a second node, from each of a plurality of said first nodes, a respective share of a computed secret, wherein each said first node calculates its share of the computed secret by carrying out at least one predetermined computation on shares of a respective plurality of said secrets allocated to said nodes; and
determining, at said second node, the computed secret by means of polynomial interpolation of at least a threshold number of said shares of said computed secret.

22. A method according to claim 21, wherein each respective polynomial function is of form:

$$f_i = \sum_{t=0}^{(k-1)} a_t x^t \mod n$$

where $f_i$ is the polynomial function of an ith node, n is an integer order of an elliptic curve, x is a variable in the polynomial function, $a_t$ is a set of coefficients for the polynomial function, and t is an index.

23. A method according to claim 21, further comprising communicating to a plurality of nodes an elliptic curve point multiplication of each coefficient of a plurality of said polynomial functions.

24. A method according to claim 21, further comprising communicating to a plurality of nodes an elliptic curve point multiplication of a value of at least one said polynomial function associated with each of said plurality of said nodes.

25. A method according to claim 24, further comprising verifying consistency between an elliptic curve point multiplication of a value of at least one said polynomial function associated with at least one said node and a sum of elliptic curve point multiplications of coefficients of said polynomial function.

26. A method according to claim 21, wherein determining a share of the computed secret includes determining:

$$\mu_i = x_i \cdot y_i \mod n$$

wherein $x_i$ is a share of a first secret, $y_i$ is a share of a second secret and n is an integer order of an elliptic curve.

27. A method according to claim 21, wherein determining a share of the computed secret includes determining:

$$x_i + y_i \mod n$$

wherein $x_i$ is a share of a first secret, $y_i$ is a share of a second secret and n is an integer order of an elliptic curve.

28. A method according to claim 21, wherein determining a share of the computed secret includes determining:

$$x_i^{-1} \mod n$$

wherein $x_i^{-1}$ is a reciprocal, modulo n, of a share of a first secret, and n is an integer order of an elliptic curve.

29. A method according to claim 21, further comprising providing a modified share of the computed secret by adding a share of a zero secret, wherein the zero secret is a constant term of a polynomial function, equal to zero, such that the computed secret is accessible by means of polynomial interpolation of a threshold number of said modified and is inaccessible in the absence of said threshold number of shares.

30. A method according to claim 21, wherein the step of determining the computed secret comprises determining a polynomial function corresponding to the shares of the computed secret, by means of determining coefficients of the polynomial function from a plurality of known values of the shares of the computed secret.

31. A method according to claim 30, wherein the step of determining said polynomial function comprises executing an error correction algorithm.

32. A method according to claim 30, wherein the step of determining said polynomial function comprises executing a Berlekamp-Welch decoding algorithm.

33. A method according to claim 30, wherein the step of determining said polynomial function comprises:
defining an error locator polynomial function and a second polynomial function, wherein the second polynomial function is a product of said polynomial function associated with the shares of the computed secret and said error locator polynomial function, determining coefficients of said second polynomial function and said error locator polynomial function from a plurality of known values of said shares of said computed secret, and determining said polynomial function associated with said shares of said computed secret from said second polynomial function and an error detector polynomial function.

34. A computer-implemented method of distributing, among a plurality of nodes, shares of a private key of a public-private key cryptography system, wherein each said node has a respective first secret, a respective first polynomial function with that node's respective first secret set as its constant term, and a respective first share of a private key, wherein the private key is a sum of the first secrets and is the constant term of a second polynomial function, wherein the private key is accessible by means of polynomial interpolation of at least a threshold number of said first shares and is inaccessible to less than said threshold number of said first shares, the nodes including a first node the method performed by the first node comprising:

selecting a respective third polynomial function having zero set as the respective constant term of said third polynomial function;

for each other node of the plurality of nodes, setting a variable in the third polynomial function to a value associated with that other node, determining a respective result of the third polynomial function for that value, and securely communicating the respective result to that other node;

receiving, from each other node, a respective share of a respective second secret, wherein said share is a result of that other node's respective third polynomial function for a first value associated with said first node; and forming and storing a respective second share of the private key, wherein said second share is the sum of the respective first share and the sum of the received shares of the second secrets.

35. A method according to claim 34, further comprising communicating, to the other nodes, an elliptic curve point multiplication of each of the respective results; and communicating, to the other nodes, elliptic curve point multiplications of coefficients of the third polynomial function associated with said first node.

36. A method according to claim 34, further comprising receiving, from each other node, an elliptic curve point multiplication of the result associated with that node; and receiving, from each other node, elliptic curve point multiplications of coefficients of the third polynomial function associated with that node.

37. A method according to claim 36, further comprising checking consistency of the result associated with at least one other node with the coefficients of the third polynomial function associated with that other node.

38. A method according to claim 34, further comprising generating a share of a digital signature based on a message and said second share of the private key.

39. A method according to claim 34, further comprising receiving, from at least a threshold number of nodes, respective shares of a digital signature based on a message and respective second shares of the private key; and generating a digital signature by means of polynomial interpolation of at least a threshold number of said shares of the digital signature.

40. A computing device to participate in a blockchain transaction, the computing device being a first node of a plurality of nodes, the computing device comprising:

a processor;

a memory;

a network interface to provide network connectivity to the other nodes in the plurality of nodes; and a blockchain application containing computer-executable instructions that, when executed by the processor, cause the processor to carry out a method of securely generating a threshold vault, where the threshold vault has a public key address, a private key and a threshold k, each node of the plurality of nodes having a respective first secret and a respective k−1 degree polynomial function with that node's respective first secret set as the constant term of said polynomial function, the nodes including a first node having a first polynomial function, the method performed by the first node comprising:

for each other node of the plurality of nodes, setting a variable in the first polynomial function to a value associated with that other node, finding a respective result of the polynomial function for that value, and securely communicating the respective result to that other node;

receiving, from at least a threshold number of the other nodes, respective second secrets, where each of the respective second secrets is a result of that other node's respective polynomial function for a first value associated with said first node;

communicating, to the other nodes, an elliptic curve point multiplication of each of the respective results;

receiving, from at least the threshold number of the other nodes, elliptic curve point multiplications of the respective second secrets shared by the other nodes with any of the nodes;

forming and storing a first private key share of the private key based on a sum of the respective second secrets received from the other nodes; and determining the public key corresponding to the private key based on a sum of the received elliptic curve point multiplications of the respective second secrets and using polynomial interpolation.

41. A computing device to participate in a blockchain transaction, the computing device being a first node of a plurality of nodes, the computing device comprising:

a processor;

a memory;

a network interface to provide network connectivity to the other nodes in the plurality of nodes; and a blockchain application containing computer-executable instructions that, when executed by the processor, cause the processor to carry out a method of securely generating a digital signature for a message relating to a threshold vault, where the threshold vault has a public key address, a private key and a threshold, each node of the plurality of nodes having a respective private key share, ephemeral key share, multiplicative mask share, first additive mask share, and second additive mask share, the method performed by a first node of the plurality of nodes comprising:

generating and sharing a double masked key share from the ephemeral key share masked by the multiplicative key share and by the first additive key share, and an elliptic curve point multiplication of the multiplicative key share;

receiving, from at least a threshold number of other nodes, the respective double masked key shares corresponding to said nodes and respective elliptic curve point multiplication (ECPM) of the multiplicative key shares corresponding to said nodes;

determining a first signature component using polynomial interpolation over the double masked key shares and polynomial interpolation over the ECPM of the multiplicative key shares; and determining and revealing a second signature component share based on the message, the private key share, the first signature component, the ephemeral key share, masked by the second additive mask share, whereby the second signature component is obtainable from the respective second signature component shares of at least the threshold number of the nodes.

42. A computing device to participate in a blockchain transaction, the computing device being a first node of a plurality of nodes, the computing device comprising:
- a processor;
- a memory;
- a network interface to provide network connectivity to the other nodes in the plurality of nodes; and
- a blockchain application containing computer-executable instructions that, when executed by the processor, cause the processor to carry out a method of multi-party computation, the method comprising:
  - distributing, among the plurality of first nodes, shares of a plurality of secrets, wherein each said secret is a constant term of a respective polynomial function, and each said share is a respective value of the polynomial function associated with said first node, wherein the secret is accessible by means of polynomial interpolation of a threshold number of said shares and is inaccessible in the absence of said threshold number of shares;
  - receiving, at a second node, from each of a plurality of said first nodes, a respective share of a computed secret, wherein each said first node calculates its share of the computed secret by carrying out at least one predetermined computation on shares of a respective plurality of said secrets allocated to said nodes; and
  - determining, at said second node, the computed secret by means of polynomial interpolation of at least a threshold number of said shares of said computed secret.

43. A computing device to participate in a blockchain transaction, the computing device being a first node of a plurality of nodes, the computing device comprising:
- a processor;
- a memory;
- a network interface to provide network connectivity to the other nodes in the plurality of nodes; and
- a blockchain application containing computer-executable instructions that, when executed by the processor, cause the processor to carry out a method of distributing, among the plurality of nodes, shares of a private key of a public-private key cryptography system, wherein each said node has a respective first secret, a respective first polynomial function with that node's respective first secret set as its constant term, and a respective first share of a private key, wherein the private key is the sum of the first secrets and is the constant term of a second polynomial function, wherein the private key is accessible by means of polynomial interpolation of at least a threshold number of said first shares and is inaccessible to less than said threshold number of said first shares, the nodes including a first node, the method performed by the first node comprising:
  - selecting a respective third polynomial function having zero set as the respective constant term of said third polynomial function;
  - for each other node of the plurality of nodes, setting a variable in the third polynomial function to a value associated with that other node, determining a respective result of the third polynomial function for that value, and securely communicating the respective result to that other node;
  - receiving, from each other node, a respective share of a respective second secret, wherein said share is a result of that other node's respective third polynomial function for a first value associated with said first node; and
  - forming and storing a respective second share of the private key, wherein said second share is the sum of the respective first share and the sum of the received shares of the second secrets.

* * * * *